United States Patent
Funaki

(10) Patent No.: US 9,843,748 B2
(45) Date of Patent: Dec. 12, 2017

(54) SOLID-STATE IMAGE PICKUP DEVICE

(71) Applicant: JVC KENWOOD Corporation, Yokohama-shi, Kanagawa (JP)

(72) Inventor: Masaki Funaki, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 0 days.

(21) Appl. No.: 15/265,280

(22) Filed: Sep. 14, 2016

(65) Prior Publication Data
US 2017/0078597 A1 Mar. 16, 2017

(30) Foreign Application Priority Data
Sep. 15, 2015 (JP) ................. 2015-181815

(51) Int. Cl.
| | | |
|---|---|---|
| H04N 5/217 | (2011.01) | |
| H04N 5/357 | (2011.01) | |
| H04N 5/353 | (2011.01) | |
| H04N 5/355 | (2011.01) | |
| H04N 5/3745 | (2011.01) | |
| H04N 5/378 | (2011.01) | |

(52) U.S. Cl.
CPC ......... H04N 5/3575 (2013.01); H04N 5/3532 (2013.01); H04N 5/35554 (2013.01); H04N 5/378 (2013.01); H04N 5/37452 (2013.01)

(58) Field of Classification Search
None
See application file for complete search history.

(56) References Cited

U.S. PATENT DOCUMENTS
2016/0088249 A1  3/2016  Funaki

FOREIGN PATENT DOCUMENTS
JP       2012-248952        12/2012

*Primary Examiner* — Stephen Coleman
(74) *Attorney, Agent, or Firm* — Procopio, Cory, Hargreaves & Savitch LLP

(57) ABSTRACT

A solid-state image pickup device includes a first optical signal accumulation unit configured to accumulate a first optical signal obtained by performing an optoelectronic conversion in a first period by an optoelectronic conversion unit, a first reference potential accumulation unit configured to accumulate a first reference potential corresponding to the first optical signal, a second optical signal accumulation unit configured to accumulate a second optical signal obtained by performing an optoelectronic conversion in a second period by the optoelectronic conversion unit, the second period being shorter than the first period, and a combining unit configured to perform a CDS process by using at least the first reference potential accumulated in the first reference potential accumulation unit and combine the first optical signal accumulated in the first optical signal accumulation unit and the second optical signal accumulated in the second optical signal accumulation unit.

8 Claims, 13 Drawing Sheets

SOLID-STATE IMAGE PICKUP DEVICE

CROSS REFERENCE TO RELATED APPLICATION

This application is based upon and claims the benefit of priority from Japanese patent application No. 2015-181815, filed on Sep. 15, 2015, the disclosure of which is incorporated herein in its entirety by reference.

BACKGROUND

1. Field of the Invention

The present invention relates to a solid-state image pickup device.

2. Description of Related Art

A back-side illuminated solid-state image pickup device that performs a global shutter operation has been proposed. For this technique, Japanese Unexamined Patent Application Publication No. 2012-248952 discloses a solid-state image pickup device in which a first substrate is electrically connected to a second substrate. In Japanese Unexamined Patent Application Publication No. 2012-248952, photodiodes are disposed on the first substrate and a memory composed of capacitors is provided on the second substrate. Further, a global shutter operation is carried out by recording optical signals in the capacitors disposed on the second substrate.

Note that for increasing the dynamic range in a CMOS (Complementary Metal-Oxide-Semiconductor) image sensor, there is a method in which an optical signal obtained by a short-time exposure is combined with an optical signal obtained by a long-time exposure. When this method is implemented in a back-side illuminated solid-state image pickup device with capacitors disposed therein, it is necessary to provide the solid-state image pickup device with capacitors that are used to separately accumulate optical signals obtained by long-time exposures and those obtained by short-time exposures. Therefore, it is necessary to increase the number of capacitors. For example, in the case of Japanese Unexamined Patent Application Publication No. 2012-248952, it is necessary to add two additional capacitors corresponding to a clamp capacitance and an analog memory. Further, a transistor that is used as a switch for selecting one of these capacitors also needs to be added.

SUMMARY

It should be noted when the number of capacitors is increased, the area occupied by each capacitor needs to be reduced because the area (i.e., the size) of the substrate is limited. As a result, the capacitance of the capacitor is reduced. Further, assuming that the leak current is unchanged, the smaller the capacitances of the capacitors are, the more the image quality deteriorates. Therefore, when the method in which the number of capacitors is simply increased is used, the image quality deteriorates. Accordingly, it is desired to prevent or reduce the increase in the number of capacitors.

Therefore, a first exemplary aspect is a solid-state image pickup device including: an optoelectronic conversion unit; a first optical signal accumulation unit configured to accumulate a first optical signal obtained by performing an optoelectronic conversion in a first period by the optoelectronic conversion unit; a first reference potential accumulation unit configured to accumulate a first reference potential corresponding to the first optical signal; a second optical signal accumulation unit configured to accumulate a second optical signal obtained by performing an optoelectronic conversion in a second period by the optoelectronic conversion unit, the second period being shorter than the first period; and a combining unit configured to perform a CDS process by using at least the first reference potential accumulated in the first reference potential accumulation unit and combine the first optical signal accumulated in the first optical signal accumulation unit and the second optical signal accumulated in the second optical signal accumulation unit.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Exemplary Embodiment

Exemplary embodiments are explained hereinafter with reference to the drawings.

Figure 1:
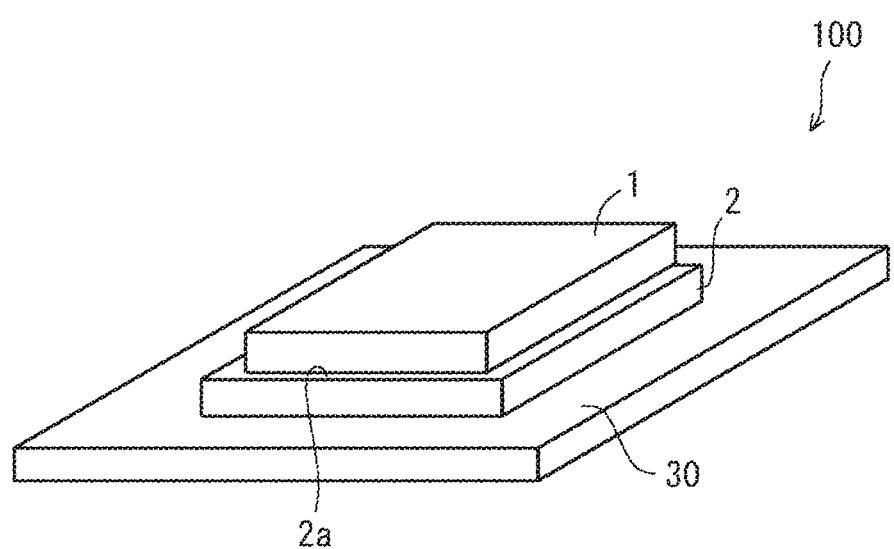
FIG. 1 is an overall view of a solid-state image pickup device according to a first exemplary embodiment.

FIG. 1 is an overall view of a solid-state image pickup device 100 according to a first exemplary embodiment. The solid-state image pickup device 100 includes a substrate 1, which is a first substrate, a substrate 2, which is a second substrate, and a substrate 30, which is a third substrate. The substrate 1 has a region in which pixels each of which has a circuit for converting light into an optical signal are arranged. The substrate 2 includes a circuit that receives optical signals from the substrate 1 and processes the received optical signals. The substrate 30 is a radiator plate and has a function of externally releasing heat generated in the substrates 1 and 2 from the rear surface of the substrate 2. That is, heat generated in the substrate 1 is externally released through the substrate 2. Note that the substrate 30 may be provided with, for example, a temperature control unit that actively releases heat by using a Peltier device or the like. Further, when the surface of each of the substrates 1 and 2 in which transistors and a wiring layer are formed is referred to as a "front surface", this means the front surfaces of the substrates 1 and 2 are opposed to each other. Further, the substrate 30 is disposed on the rear surface side of the substrate 2.

Further, the thickness of the silicon layer of the substrate 1 is, for example, about 10 μm. Further, the thickness of the silicon layer of the substrate 2 is, for example, about 200 to 1,000 μm. Further, the thickness of the substrate 30 is, for example, about 1,000 to 3,000 μm. Note that the material for the substrate 30 may be a metal, a ceramic having a high conductivity, a plastic, a carbon material such as diamond, sapphire, or the like. Further, the substrate 30 may be one of various types of semiconductor substrates or a multi-layered circuit board. Further, the substrate 30 does not necessarily have to be a separate substrate and may instead be a part of a package.

Regarding the relation among the respective sizes of the substrates, the area (i.e., size) of the substrate 2 is larger than that of the substrate 1 and the area (i.e., size) of the substrate 30 is larger than that of the substrate 2 in the example shown in FIG. 1. Pads 2a are provided in the part of the substrate 2 that extends beyond the substrate 1, and signals are exchanged between the substrate 2 and external circuits through these pads 2a. It should be noted that the relation among the respective sizes of the substrates is not limited to the above-described relation. For example, the respective sizes of the substrates may be the same as each other. Further, a through-tunnel(s), for example, may be formed between the front and rear surfaces of the substrate 2 and a micro-bump(s) may be formed in the through-tunnel(s). In this case, the substrate 1 may be connected to the substrate 30 by using the micro-bump(s), so that signals or electric power may be exchanged between the substrate 1 and external circuits through the substrate 30.

Figure 2:
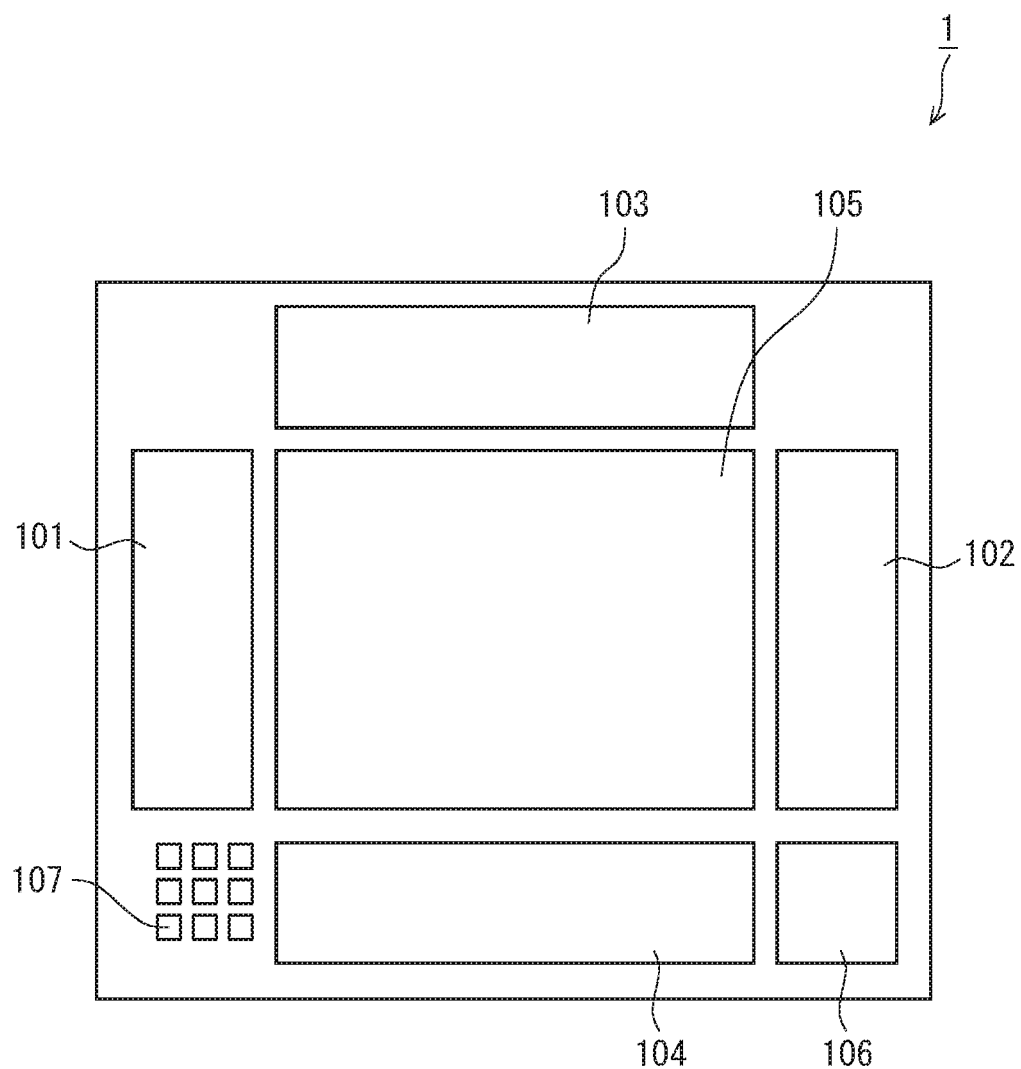
FIG. 2 shows an overall configuration of a first substrate of the solid-state image pickup device according to the first exemplary embodiment.

FIG. 2 shows an overall configuration of the substrate 1, which is the first substrate of the solid-state image pickup device 100 according to the first exemplary embodiment. The substrate 1 includes a pixel-arranged region 105, peripheral circuits 101, 102, 103, 104 and 106, and pads 107. In the pixel-arranged region 105, parts of pixel circuits including photo-diodes are arranged in an orderly manner. Peripheral circuits 101, 102, 103 and 104 include drive circuits for driving pixels and the like. By these drive circuits, each pixel disposed in the pixel-arranged region 105 performs a predetermined operation. The peripheral circuit 106 includes a control circuit that controls the above-described driving circuits so that they operate properly. Specifically, the control circuit performs control as to which pixels should be driven at which timings. Further, the peripheral circuit 106 is provided with a power supply circuit that stably supplies electric power. The pads 107 connect the substrate 1 with the substrate 2 and are used to exchange signals between the substrates 1 and 2. Further, electric power is also exchanged through the pads 107.

Figure 3:
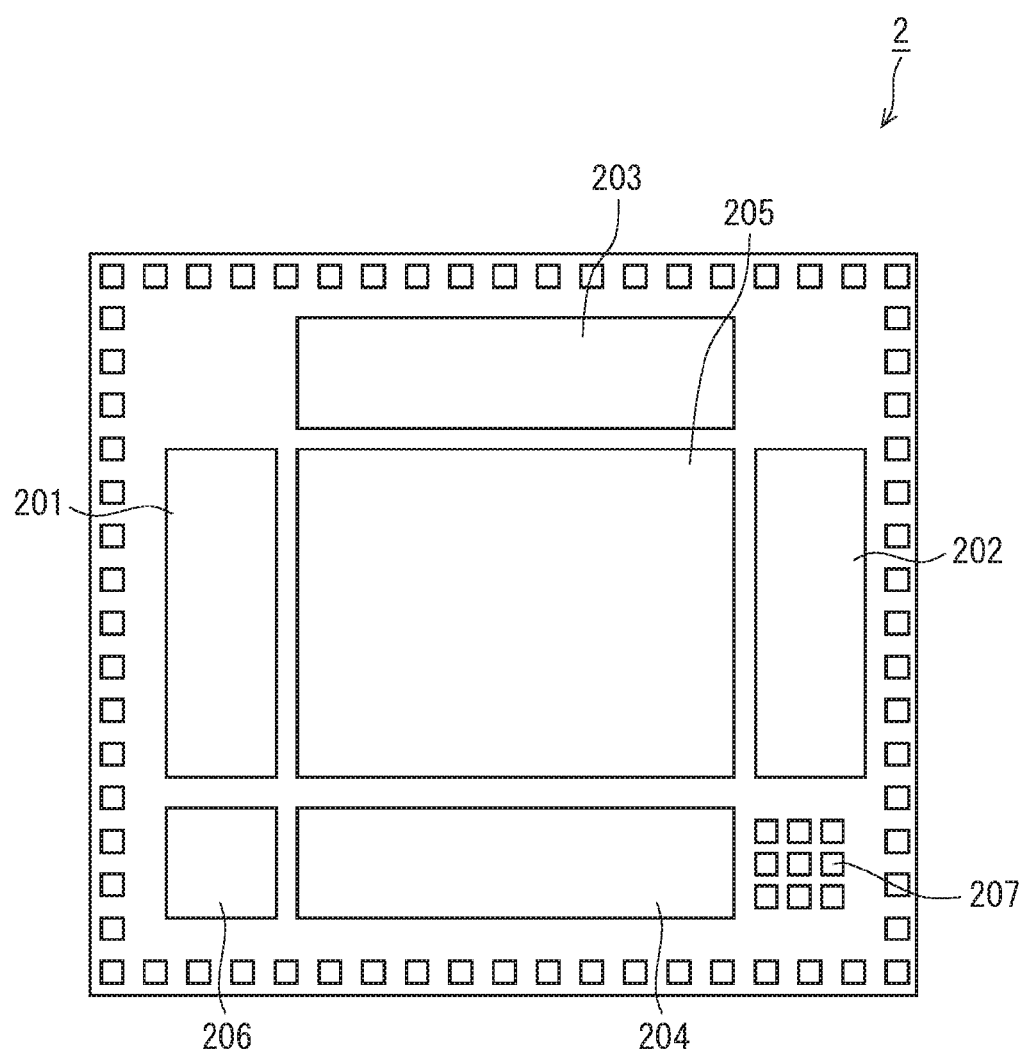
FIG. 3 shows an overall configuration of a second substrate of the solid-state image pickup device according to the first exemplary embodiment.

FIG. 3 shows an overall configuration of the substrate 2, which is the second substrate of the solid-state image pickup device 100 according to the first exemplary embodiment. The substrate 2 includes a pixel-arranged region 205, peripheral circuits 201, 202, 203, 204 and 206, and pads 207. In the pixel-arranged region 205, another set of pixel circuits corresponding to those in the pixel-arranged region 105 are arranged in an orderly manner. The pixel circuits disposed in the pixel-arranged region 205 are configured to receive optical signals from the pixel circuits disposed in the pixel-arranged region 105 and hold the received optical signals. That is, a pixel circuit disposed in the substrate 1 and a corresponding pixel circuit disposed in the substrate 2 form one pixel circuit.

The peripheral circuits 201, 202, 203, 204 and 206 include a digital-analog conversion circuit, an analog-digital conversion circuit, an image processing circuit that performs image processing, a power supply circuit, a timing adjustment circuit, a clock signal supply circuit, and so on. The analog-digital conversion circuit is a circuit that performs an analog-digital conversion for an optical signal or a reference potential on a row-by-row basis or a column-by-column basis. The digital-analog conversion circuit includes a digital-analog converter that generates an intermediate potential signal for each circuit and generates a high-performance ramp waveform necessary for an analog-digital conversion. The image processing circuit is a circuit that receives a signal from each pixel and thereby forms an image. For example, the image processing circuit includes a white-spot correction function, a gray-scale setting function, a white-balance setting function, a field memory, a still image/moving image compression circuit, and a circuit for performing serial communication with an external entity. The pads 207 connect the substrate 1 with the substrate 2 and are used to exchange signals between the substrates 1 and 2.

Note that FIGS. 2 and 3 show the substrates 1 and 2, respectively, as viewed from their front surface sides. The substrates 1 and 2 are arranged so that their front sides are opposed to each other. In other words, the substrates 1 and 2 are configured in such a manner that one of the substrates 1 and 2 shown in FIGS. 2 and 3 is flipped over in the horizontal direction and connected to the other of the substrates 1 and 2. Therefore, the pads 107 and the pads 207 are disposed so that they are opposed to each other, and they are connected to each other through micro-bumps. Note that pads and micro-bumps are also provided between the pixel-arranged regions 105 and 205 and they connect the pixel-arranged regions 105 and 205 to each other.

Figure 4:
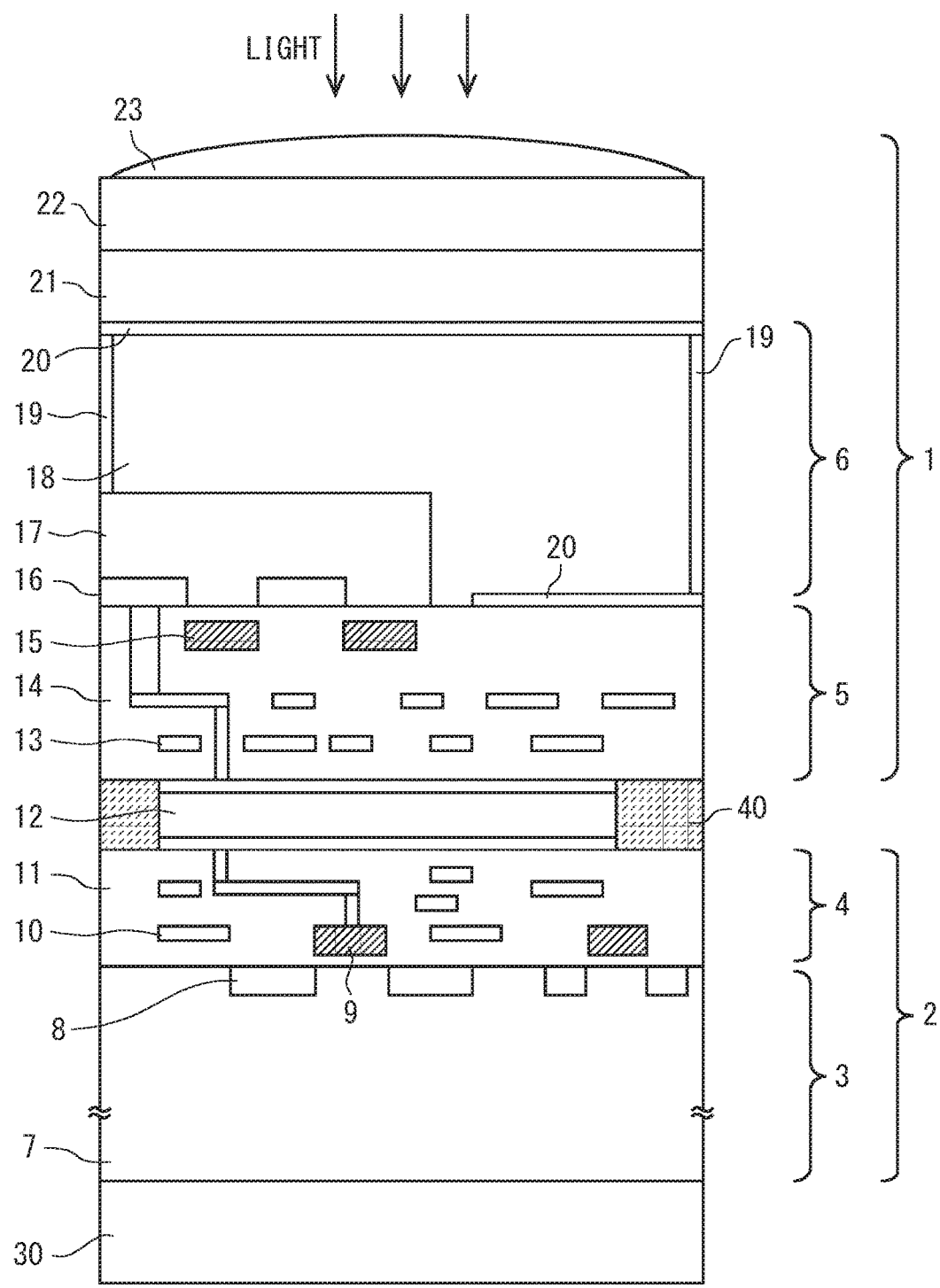
FIG. 4 shows a schematic cross section of the solid-state image pickup device in a state where a first substrate is connected to a second substrate.

FIG. 4 shows a schematic cross section of the solid-state image pickup device in a state where the substrate 1, which is the first substrate, is connected to the substrate 2, which is the second substrate. As described above, the substrates 1 and 2 are arranged so that their front surfaces are opposed to each other. That is, the upper side in the cross section shown in FIG. 4 is the rear side of the substrate 1 and the lower side in the cross section is the rear side of the substrate 2. The substrate 1 is configured so that, from the front surface side, a wiring region 5, a silicon region 6, an insulating film 21 such as a silicon oxide film, a color filter 22, and a micro-lens 23 are stacked on top of one another. Further, the substrate 2 is configured so that, from the front surface side, a wiring region 4 and a silicon region 3 are stacked on top of one another.

Firstly, a configuration of the substrate 1 is explained. Light enters from the rear side of the substrate 1. The light passes through the micro-lens 23. The color filter 22 lets only light having a specific wavelength(s) pass therethrough. Then, the light, which has passed through the color filter 22, passes through the insulating film 21 and is incident on an optoelectronic conversion region 18. Note that the optoelectronic conversion region 18 is an n-type semiconductor. A first p+-type region 20 prevents the occurrence of carriers of non-optical signals, which would otherwise occur in the interface between the optoelectronic conversion region 18 and an insulating film 14 and between the optoelectronic conversion region 18 and the insulating film 21, and is also used as a region where the optoelectronic conversion region 18 is configured as an embedded photo-diode. A second p+-type region 19 is a region for isolating the optoelectronic conversion region of the pixel from that of an adjacent pixel. A p-well region 17 is a region where an n-MOSFET (Metal-Oxide-Semiconductor Field-Effect Transistor) used for the pixel is formed. The MOSFET in the pixel is composed of the p-well region 17, an n+-type region 16 that becomes a source and a drain, and a gate electrode 15. An optical signal electric charge (i.e., an electric charge generated by an optical signal) is converted into a voltage by this MOSFET. Further, an optical signal having this voltage (i.e., an electric signal having the voltage representing the optical signal) passes through the inside of the wiring region 5, which is composed of the insulating film 14 and a metal line 13, reaches a connection section 12, and is transferred to the substrate 2. The optical signal having the voltage (i.e., the electric signal having the voltage representing the optical signal), which has been transferred to the substrate 2, passes through the inside of the wiring area 4, which is composed of an insulating film 11 and a metal line 10, and is transferred to a MOSFET disposed in the substrate 2. The MOSFET of the substrate 2 is composed of a p-type substrate 7 including a p-well region, source/drain regions 8, and a gate electrode 9. Further, a MOS capacitor is formed by using a gate electrode and the like. In this way, a second pixel circuit disposed in the substrate 2 is formed.

Note that although only an n-MOSFET is included in the pixel disposed in the substrates 1 and 2 in the example shown in FIG. 4, instead only a p-MOSFET may be included in the pixel in other examples. In such cases, the conductive types of the optoelectronic conversion region 18, the p-well region 17, the n+-type region 16, the p-type substrate 7, and the source/drain regions 8 are all reversed. Further, a C-MOS circuit may be formed by forming a p-well region and an n-well region in the pixel. Note that although only the pixel section is shown in FIG. 4, a CMOS circuit may also be used for the peripheral circuits 101-104 and 106 disposed around the pixel-arranged region 105, as shown in FIG. 2.

Figure 5:
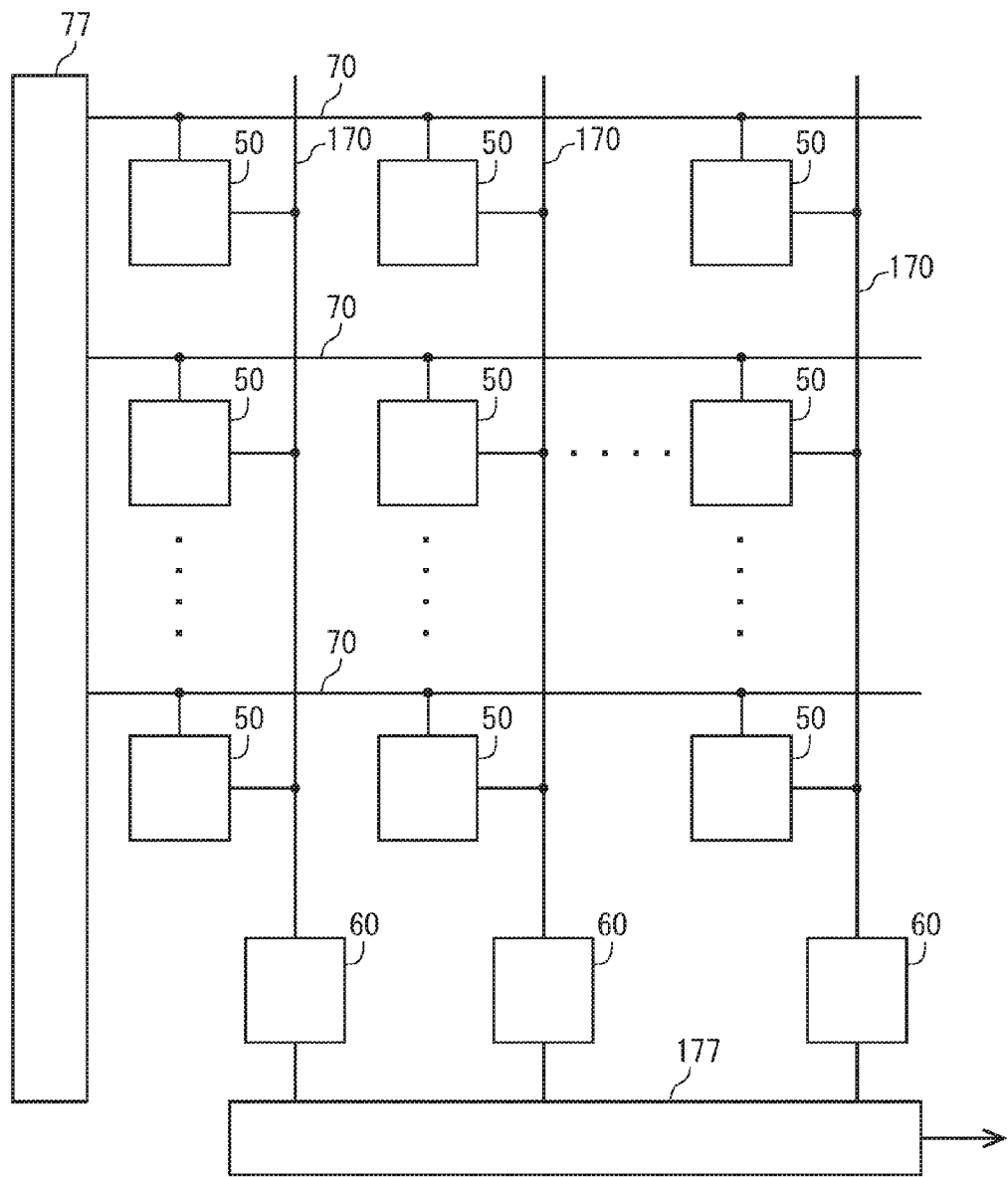
FIG. 5 shows a pixel configuration of the solid-state image pickup device according to the first exemplary embodiment.

FIG. 5 shows a pixel configuration of the solid-state image pickup device 100 according to the first exemplary embodiment. A plurality of pixel units 50 are provided in the pixel-arranged areas 105 and 205. As shown in FIG. 5, the plurality of pixel units 50 are arranged in a matrix pattern. Note that FIG. 5 schematically shows a state in which those pixel units 50 are arranged in a matrix pattern. In reality, as described above with reference to FIG. 4, those pixel units 50 do not necessarily have to be arranged with spatial intervals therebetween.

Each pixel unit 50 is connected to a vertical scan circuit 77 through a row signal line 70 and also connected to a column processing circuit 60 through a column signal line 170. Further, each column processing circuit 60 is connected to a horizontal scan circuit 177. A vertical scan circuit 77 is provided in each of the peripheral circuits 101 and 102 and each of peripheral circuits 201 and 202. Further, column processing circuits 60 and a horizontal scan circuit 177 are provided in each of the peripheral circuits 103 and 104 and each of the peripheral circuits 203 and 204.

The vertical scan circuit 77 is composed of, for example, a shift-register and controls the driving of the pixel units 50 on a row-by-row basis. This driving control includes an initialization operation (reset operation), an accumulation operation, a signal reading operation, and the like of the pixel units 50. To perform this driving control, the vertical scan circuit 77 outputs a control signal (control pulse) to each pixel unit 50 through the row signal line 70, one of which is provided for each row, and thereby independently controls the pixel units 50 on a row-by-row basis. As the vertical scan circuit 77 performs the driving control, a pixel signal is output from the pixel unit 50 to the column signal line 170, one of which is provided for each column.

The column processing circuit 60 processes a signal that is output from the pixel unit 50 to the column signal line 170. The column processing circuit 60 functions as a combining unit that combines a plurality of optical signals obtained by exposures performed at a plurality of different timings. Details of this function are described later. The horizontal scan circuit 177 is composed of, for example, a shift-register. The horizontal scan circuit 177 reads pixel signals by selecting a pixel column from which pixel signals should be read, successively selecting a column processing circuit 60 associated with the selected pixel column, and successively outputting the signals output from the column processing circuit 60 to the subsequent circuit.

Figure 6:
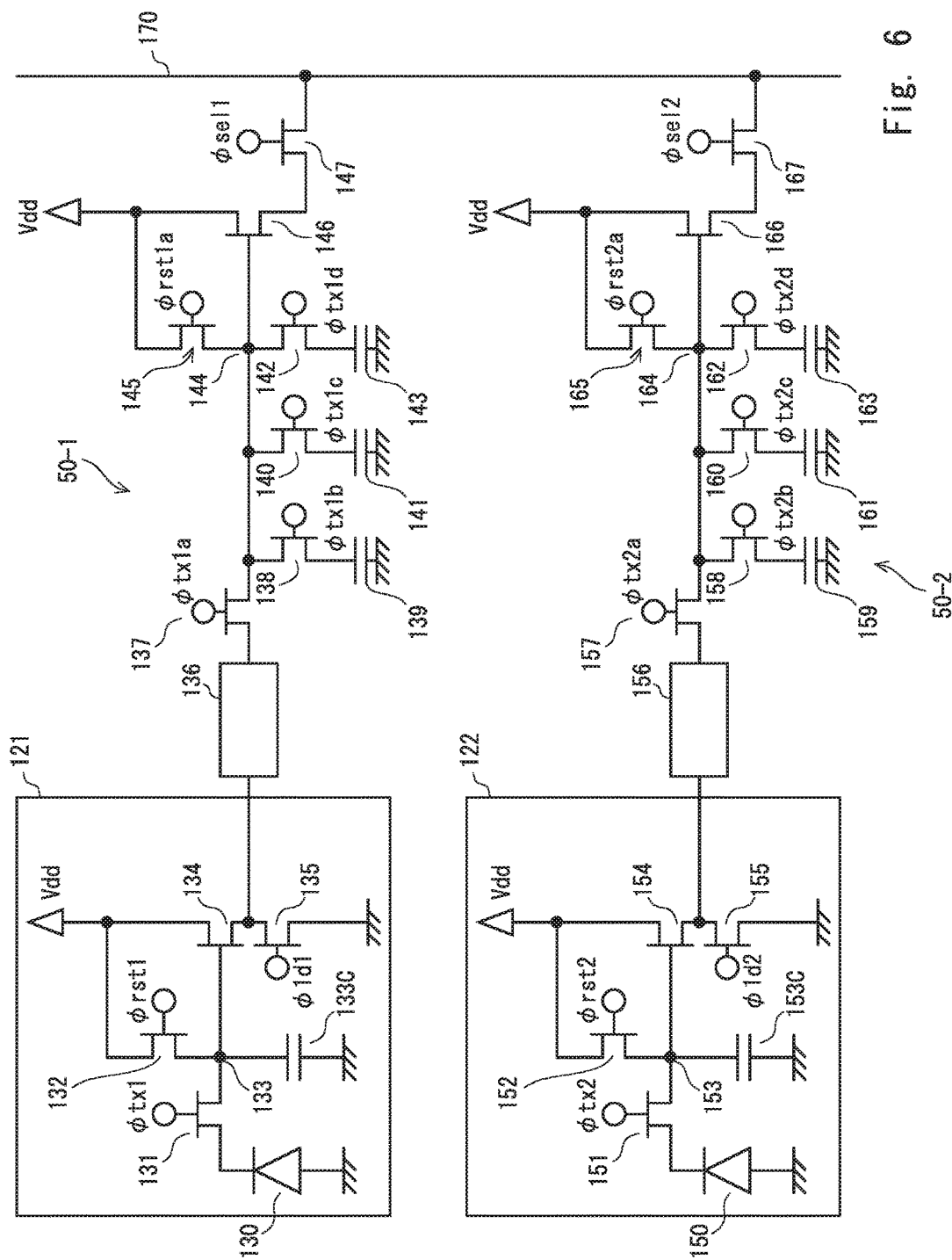
FIG. 6 shows details of a circuit configuration of each pixel of the solid-state image pickup device according to the first exemplary embodiment.

FIG. 6 shows details of a circuit configuration of each pixel of the solid-state image pickup device 100 according to the first exemplary embodiment. In FIG. 6, two pixel units 50-1 and 50-2, which are connected to the same column signal line 170, are shown. Each of connection sections 136 and 156 corresponds to the connection section 12 shown in FIG. 4 and connects the substrate 1 to the substrate 2. The sections located on the left side of the connection sections 136 and 156 are formed in the substrate 1 and the sections located on the right side of the connection sections 136 and 156 are formed in the substrate 2. On the substrate 1 side, optoelectronic conversion circuits 121 and 122 that convert light into electric signals are formed. On the substrate 2 side, signal holding circuits that hold electric signals until appropriate timings (i.e., until appropriate time points) and output circuits that output the held signals to the column signal line 170 are formed as main components thereof. Details of these components are described later.

Firstly, the optoelectronic conversion circuits 121 and 122 are explained. The optoelectronic conversion circuits 121 and 122 include photo-diodes 130 and 150, respectively. Each of the photo-diodes 130 and 150 functions as an optoelectronic conversion part that performs an optoelectronic conversion and hence converts incident light into an electric charge, i.e., into hole/electron pairs. Of the hole/electron pairs, either the holes or the electrons are accumulated in the photo-diodes 130 and 150. In this exemplary embodiment, electrons are accumulated in the photo-diodes 130 and 150. Further, a transfer transistor 131 is connected between the photo-diode 130 and a floating diffusion 133, and a transfer transistor 151 is connected between the photo-diode 150 and a floating diffusion 153. The transfer transistors 131 and 151 are controlled by signals φtx1 and φtx2, respectively, output from the vertical scan circuit 77. When the transfer transistors 131 and 151 are turned on by the signals φtx1 and φtx2, respectively, electrons accumulated in the photo-diodes 130 and 150 are transferred to the floating diffusions 133 and 153, respectively.

Each of the floating diffusions 133 and 153 is a minute floating capacitance formed by a diffusion layer. Specifically, the floating diffusions 133 and 153 have floating capacitances 133C and 153C, respectively. Potentials of the floating diffusions 133 and 153 are lowered by electrons transferred to the floating diffusions 133 and 153, and electric charges are converted into electric signals in the floating diffusions 133 and 153.

A reset transistor 132 is connected between the floating diffusion 133 and a power supply voltage Vdd, and a reset transistor 152 is connected between the floating diffusion 153 and the power supply voltage Vdd. The reset transistors 132 and 152 are transistors for resetting (i.e., initializing) the floating diffusions 133 and 153, respectively, and are controlled by signals ϕrst1 and ϕrst2, respectively, output from the vertical scan circuit 77. Further, amplifier transistors 134 and 154 are connected to the floating diffusions 133 and 153, respectively. The amplifier transistors 134 and 154 amplify the potentials of the floating diffusions 133 and 153, respectively. Further, load transistors 135 and 155, which function as current sources, are connected to the ground-connection sides of the amplifier transistors 134 and 154, respectively. By applying a predetermined voltage to the gate electrodes of the load transistors 135 and 155, the load transistors 135 and 155 function as loads. This predetermined voltage may be, for example, a voltage of about 1.2 V, which is higher than a voltage threshold (which is described later). This voltage value may be adjustable, thus making it possible to change the current value. The voltages occurring in these loads are transferred to the substrate 2 side through the connection sections 136 and 156, respectively.

In the circuit on the substrate 2 side, switch transistors 137 and 157, which function as switches for turning on/off the electric connection with the substrate 1, are provided between the connection parts 136 and 156 and nodes 144 and 164. The switch transistors 137 and 157 are controlled by signals ϕtx1a and ϕtx2a, respectively, output from the vertical scanning circuit 77. Further, capacitors 139, 141 and 143 are connected to the switch transistor 137 through switch transistors 138, 140 and 142, respectively. In other words, the switch transistors 138, 140 and 142 are connected between the node 144 and the capacitors 139, 141 and 143, respectively. Further, capacitors 159, 161 and 163 are connected to the switch transistor 157 through switch transistors 158, 160 and 162, respectively. In other words, the switch transistors 158, 160 and 162 are connected between the node 164 and the capacitors 159, 161 and 163, respectively. The switch transistors 138, 140, 142, 158, 160 and 162 are controlled by signals ϕtx1b, ϕtx1c, ϕtx1d, ϕtx2b, ϕtx2c and ϕtx2d, respectively, output from the vertical scanning circuit 77. Note that each of the capacitors 139 and 159 has a function as a first reference potential accumulation unit. Further, each of the capacitors 141 and 161 has a function as a first optical signal accumulation unit. Further, each of the capacitors 143 and 163 has a function as a second optical signal accumulation unit.

A reset transistor 145 is connected between the node 144 and the power supply voltage Vdd, and a reset transistor 165 is connected between the node 164 and the power supply voltage Vdd. The reset transistors 145 and 165 are transistors that reset (i.e., initialize) the nodes 144 and 164, respectively, and are controlled by signals ϕrst1a and ϕrst2a, respectively, output from the vertical scanning circuit 77. Further, the nodes 144 and 164 are connected to the gates of amplifiers 146 and 166, respectively. The outputs of the amplifiers 146 and 166 are connected to the column signal line 170 through selection transistors 147 and 167, respectively. The selection transistors 147 and 167 are controlled by signals ϕsel1 and ϕsel2, respectively, output from the vertical scanning circuit 77. By successively switching the selection transistors 147 and 167, pixel signals accumulated in the pixel units 50-1 and 50-2, respectively, are read to the column process circuit 60.

Figure 7:
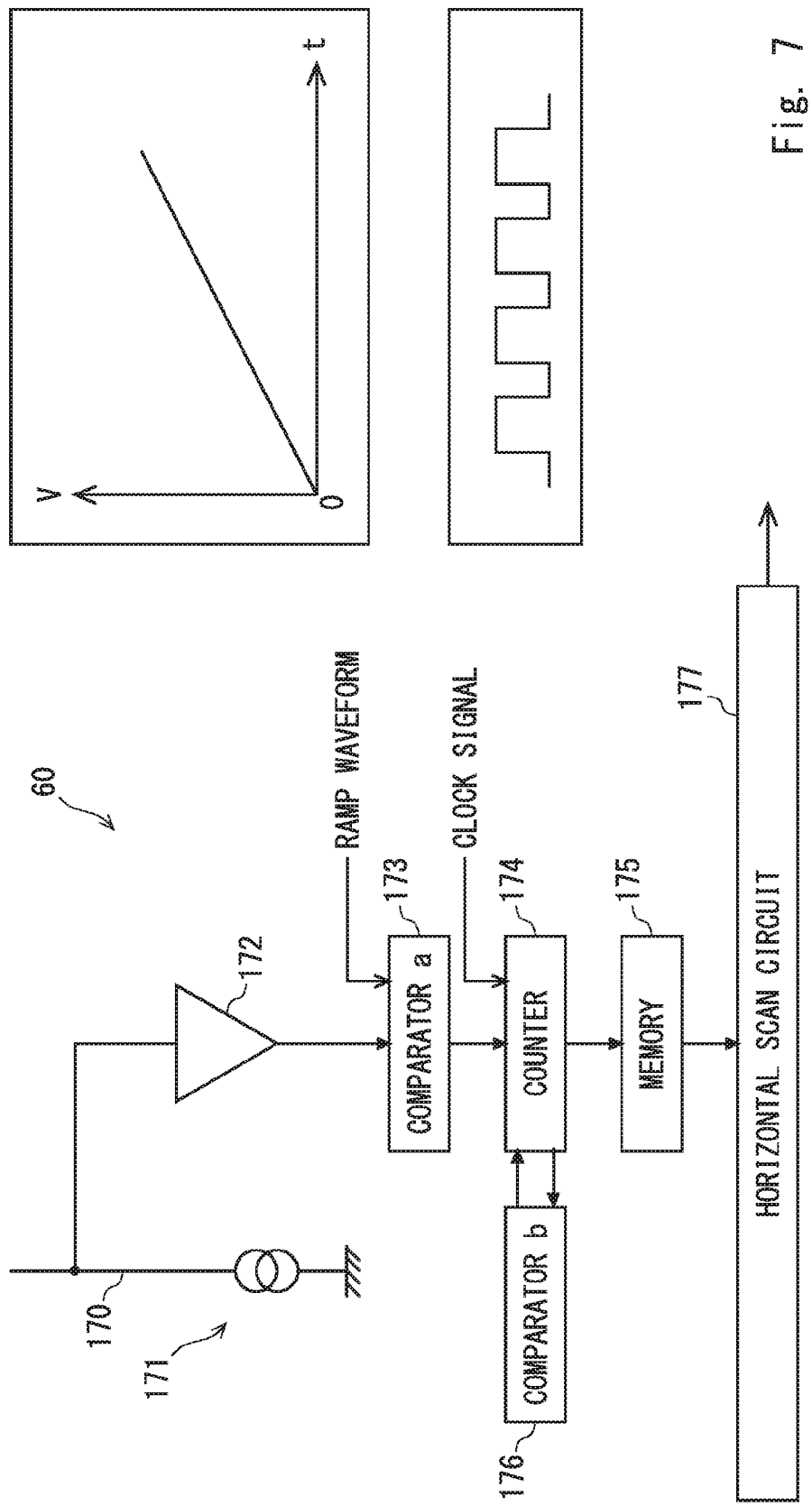
FIG. 7 shows a configuration of a column processing circuit according to the first exemplary embodiment.

FIG. 7 shows a configuration of the column processing circuit 60 according to the first exemplary embodiment. The column processing circuit 60 includes a load 171, a programmable amplifier 172, a comparator a 173, a counter 174, a memory 175, and a comparator b 176. The load 171 is a current source, and a voltage that occurs in this load 171 becomes an optical signal, i.e., a pixel signal. The programmable amplifier 172 amplifies the optical signal and outputs the amplified optical signal to the comparator a 173.

A ramp waveform is input to the comparator a 173. The ramp waveform is a waveform that is expressed in a coordinate system having a horizontal axis representing a time t and a vertical axis representing a voltage V input to the comparator a 173. Further, the voltage V is in proportion to the time t. The comparator a 173 outputs a signal to the counter 174 when its input voltage, i.e., the output voltage of the programmable amplifier 172, matches the ramp waveform. The counter 174 counts (i.e., measures) a time until the voltage value of the ramp waveform matches the output voltage of the programmable amplifier 172. In other words, the counter value is in proportion to the output voltage of the programmable amplifier 172. That is, the higher the output voltage of the programmable amplifier 172 is, the larger the counter value becomes. To put it differently, the counter value indicates a digital value corresponding to the output voltage of the programmable amplifier 172, i.e., the optical signal.

Further, the counter 174 is an up-down counter that counts a clock signal. Therefore, the counter 174 can count downwardly as well as upwardly. That is, the counter 174 counts, as an up-counter, the clock signal in a direction in which the counter value increases, i.e., in a positive direction, or counts, as a down-counter, the clock signal in a direction in which the counter value decreases, i.e., in a negative direction. When the counter 174 counts the clock signal as an up-counter, the counter value is a value that is in proportion to the output voltage of the programmable amplifier 172. On the other hand, when the counter 174 counts the clock signal as a down-counter, the counter value is a value that is in proportion to the output voltage of the programmable amplifier 172 but is reversed in terms of the polarity (i.e., positive and negative).

For example, the counter 174 counts a reference voltage (i.e., counts the clock signal for a reference voltage) as a down-counter and counts the voltage value of the optical signal (i.e., counts the clock signal for the voltage value of the optical signal) as an up-counter, and thereby performs CDS (Correlated Double Sampling) processing. In this way, the comparator a 173 and the counter 174 form an ADC (Analog-to-Digital Converter) circuit.

The comparator b 176 controls the operation of the counter. The comparator b 176 compares the counter value of the counter 174 with a predetermined threshold and thereby determines the next operation of the counter 174. This predetermined threshold is explained later in detail. The counter value of the counter 174 after the CDS processing is accumulated (i.e., added up) in the memory 175. As shown in FIG. 5, singles are output from a plurality of column signal lines 170 to the horizontal scan circuit 177 and the horizontal scan circuit 177 successively outputs signals indicating processing results received from the plurality of column signal lines 170 to the subsequent circuit. In this way, the dynamic range is increased. This operation is described later. Note that when the increase in the dynamic range is unnecessary, the comparator b 176 may not be used.

(Operation)

Next, an operation of the circuit of the pixel unit 50 shown in FIG. 6 is explained. As an operating mode, both a global shutter operation and a rolling shutter operation are possible. In the first exemplary embodiment, the dynamic range can be increased for either the global shutter operation or the rolling shutter operation as explained below.

(Global Shutter Operation)

Figure 8:
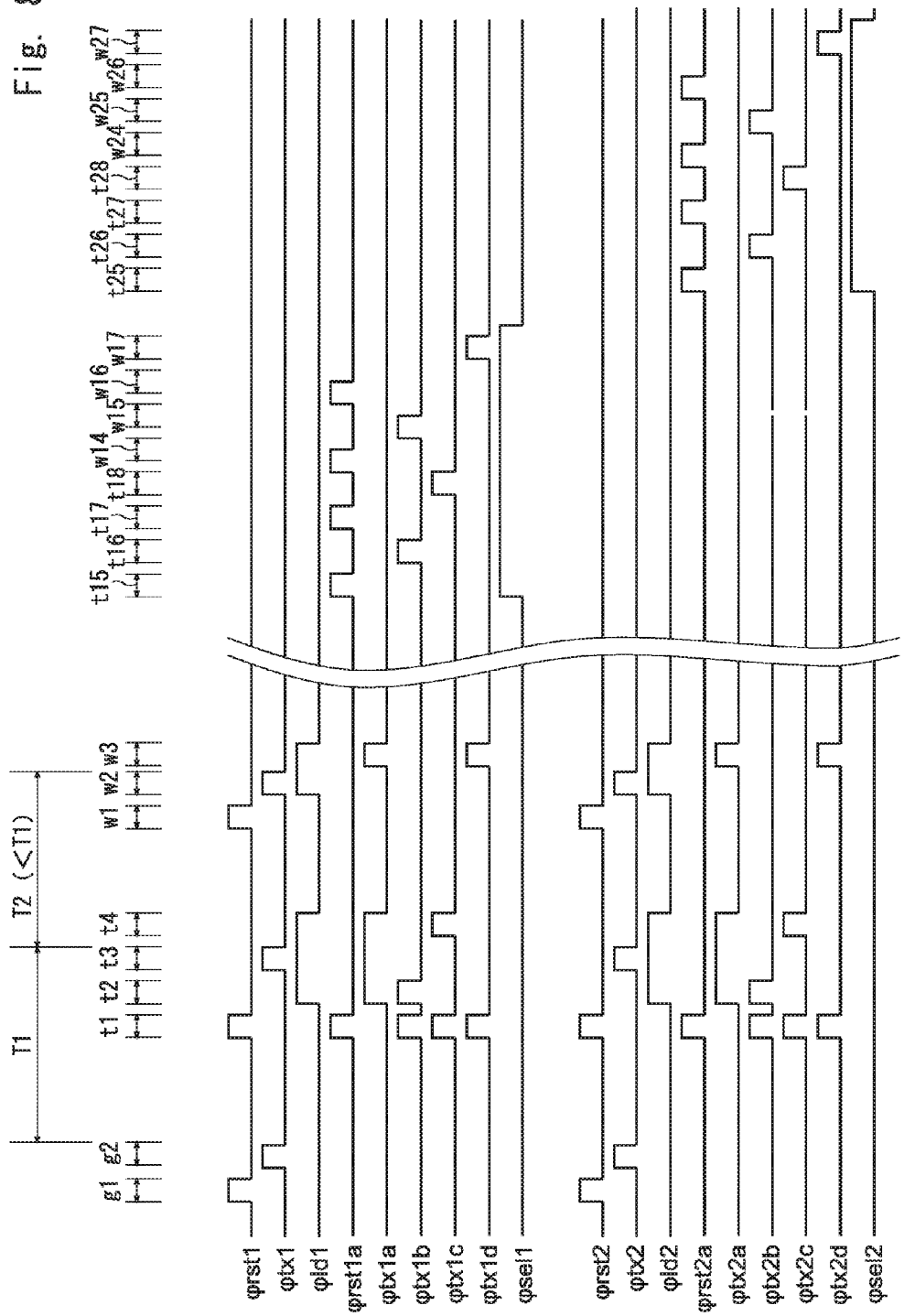
FIG. 8 shows a timing chart for a global shutter operation according to the first exemplary embodiment.

FIG. 8 shows a timing chart for a global shutter operation. The global shutter operation includes a step of simultaneously accumulating signals in capacitors in all the pixels and a step of successively reading the signals accumulated in the capacitors. The left side of the timing chart shown in FIG. 8 represents the accumulating step and the right side represents the reading step. The accumulating step is simultaneously performed for all the pixel units 50. In contrast to this, the reading step is successively performed for each pixel unit 50 by changing the pixel unit 50 electrically connected to the column signal line 170 by using the selection transistors 147 and 167.

Firstly, at a time g1, all the pixel units 50 are simultaneously initialized (i.e., reset). Specifically, as the signals ϕrst1 and ϕrst2 become a high level, the floating diffusions 133 and 153, respectively, are initialized. Next, at a time g2, as the signals ϕtx1 and ϕtx2 become a high level, electrons accumulated in the photo-diodes 130 and 150 are transferred to the floating diffusions 133 and 153, respectively. As a result, no electron remains in the photo-diodes 130 and 150. After that, an exposure is performed so that light is incident on the photo-diodes 130 and 150 in this state. That is, an optoelectronic conversion is performed. This optoelectronic conversion starts at the end of the time g2 and continues until the next electron transfer has been finished in which electrons are transferred from the photo-diodes 130 and 150 to the floating diffusions 133 and 153, respectively, again, i.e., continues to the end of a time t3. This period from the end of the time g2 to the end of the time t3 is referred to as a first period T1.

Next, at a time t1, all the pixel units 50 are simultaneously initialized (i.e., reset). Specifically, as the signals ϕrst1 and ϕrst2 become a high level, the floating diffusions 133 and 153, respectively, are initialized. Further, at this point, as the signals ϕrst1a, ϕtx1b, ϕtx1c and ϕtx1d become a high level, the capacitors 139, 141 and 143 are reset. Similarly, at this point, as the signals ϕrst2a, ϕtx2b, ϕtx2c and ϕtx2d become a high level, the capacitors 159, 161 and 163 are reset. Note that the writing of signals to the capacitors 139, 141 and 143 is performed by using a voltage that is generated in the load transistor 135 by the amplification transistor 134, and the writing of signals into the capacitors 159, 161 and 163 is performed by using a voltage that is generated in the load transistor 155 by the amplification transistor 154. Therefore, the initialization does not necessarily have to be performed. However, there is a possible problem that some amount of discrepancy could occur between when a signal is written into each capacitor in an originally high-voltage state in a voltage-decreasing direction and when a signal is written into each capacitor in an originally low-voltage state in a voltage-increasing direction. To avoid such a problem, the initialization is performed so that the voltage of each capacitor is adjusted to the high-voltage state.

As described above, the potentials in the initialized floating diffusions 133 and 153 are used as the reference potentials for the pixel units 50-1 and 50-2, respectively. At a time t2, these reference potentials are written into the capacitors 139 and 159. Specifically, as the signals ϕld1 and ϕld2 become a high level, a predefined voltage is applied to the gates of the load transistors 135 and 155, respectively. In this way, the load transistors 135 and 155 operate as current sources. As a result, currents flow through the amplifier transistors 134 and 154, thus making the amplifier transistors 134 and 154 operate as source follower circuits. Further, at this point, as the signals ϕtx1a and ϕtx1b become a high level, the reference potential is recorded in the capacitor 139 through the connection section 136. Similarly, as the signals ϕtx2a and ϕtx2b become a high level, the reference potential is recorded in the capacitor 159 through the connection section 156. The reference potential accumulated in these capacitors 139 and 159 is a first reference potential corresponding to the optical signal in the first period T1, i.e., corresponding to the first optical signal.

At this point, the electric charges (electrons in the first exemplary embodiment), which were generated by the optoelectronic conversion performed in the first period T1, have been accumulated in the photo-diodes 130 and 150 as described above. At a time t3, as the signals ϕtx1b and ϕtx2b become a low level and the signals ϕtx1 and ϕtx2 become a high level, the electric charges are transferred from the photo-diodes 130 and 150 to the floating diffusions 133 and 153, respectively. As a result, the potentials of the floating diffusions 133 and 153 change by amounts corresponding to the transferred electric charges. For example, in the case where the electric charges are electrons, the potentials of the floating diffusions 133 and 153 decrease. These changed potentials become the potentials of the optical signals of the pixel units 50-1 and 50-2 in the first period T1.

Next, at a time t4, as the signals ϕtx1c and ϕtx2c become a high level, these potential of the floating diffusions 133 and 153 after the electric charge transfer are amplified by the amplifier transistors 134 and 154, respectively, and the amplified potentials are recorded in the capacitors 141 and 161, respectively. After the recording, the signals ϕld1, ϕtx1a and ϕtx1c and the signals ϕld2, ϕtx2a and ϕtx2c become a low level and the recording of the optical signal in the first period T1, i.e., the recording of the first optical signal has been completed.

The next exposure, i.e., the next optoelectronic conversion has already started in the photo-diodes 130 and 150 since the time t3 in which the electric charges transfer from the photo-diodes 130 and 150 to the floating diffusions 133 and 153 has been finished and the signals ϕtx1 and ϕtx2 become a low level. After that, at a time w1, as the signals ϕrst1 and ϕrst2 become a high level, the floating diffusions 133 and 153, respectively, are initialized. After that, at a time w2, as the signals ϕtx1 and ϕtx2 become a high level, the electric charges are transferred from the photo-diodes 130 and 150 to the floating diffusions 133 and 153. Note that the period from the end of the time t3 to the end of the time w2 is referred to as a second period T2. At this point, the signals ϕld1 and ϕld2 are also at a high level. Next, at a time w3, as the signals ϕtx1a and ϕtx1d become a high level, the potential of the floating diffusion 133 after the electric charge transfer is amplified by the amplification transistor 134 and recorded in the capacitor 143. Similarly, as the signals ϕtx2a and ϕtx2d become a high level, the potential of the floating diffusion 153 after the electric charge transfer is amplified by the amplification transistor 154 and recorded in the capacitor 163. That is, the optical signal in the second period T2, i.e., the second optical signal is recorded in the capacitors 143 and 163. After the recording, the signals ϕld1, ϕtx1a and ϕtx1d and the signals ϕld2, ϕtx2a and ϕtx2d become a low level and the recording of the optical signal in the second period T2, i.e., the recording of the second optical signal has been completed.

Note that the first exemplary embodiment is configured so that the first period T1 is longer than the second period T2. Note that when the times g1 and g2 are not provided, the first period T1 is, at the maximum, a time from the end of the time w2 to the end of the time t3 in which the signal φtx1 is brought into a high level and electrical charges are thereby transferred in the next frame. In this way, first optical signals obtained by the optoelectronic conversion performed in the first period T1, which is longer than the second period T2, are accumulated in the capacitors 141 and 161 in the time t4. Further, the reference potentials for the first optical signals are accumulated in the capacitors 139 and 159. Further, second optical signals obtained by the optoelectronic conversion performed in the second period T2, which is shorter than the first period T1, are accumulated in the capacitors 143 and 163 in the time w3. That is, the first optical signals are optical signals that are obtained by a long-time exposure and the second optical signals are optical signals that are obtained by a short-time exposure.

As described above, in each of all the pixel parts 50, the first optical signal obtained by the optoelectronic conversion performed in the first period T1 is recorded in the capacitors 141 and 161 disposed in the substrate 2. Further, the reference potential corresponding to the first optical signal is recorded in the capacitors 139 and 159 disposed in the substrate 2. Further, the second optical signal obtained by the optoelectronic conversion performed in the second period T2 is recorded in the capacitors 143 and 163 disposed in the substrate 2. Next, the optical signals recorded in these components are read. Unlike the recording step (i.e., accumulating step), the reading step is not simultaneously performed in all the pixel units 50, but is successively performed for each sets of pixel units 50 connected to the column signal line 170, i.e., is successively performed on a row-by-row basis.

As shown in FIG. 7, the column processing circuits 60 each of which includes a load and an ADC circuit is connected to the column signal line 170. Each of these column processing circuits 60 processes a signal that is transferred through the column signal line 170. This process is explained with reference to the timing chart shown in FIG. 8 and a flowchart shown in FIG. 9.

Figure 9:
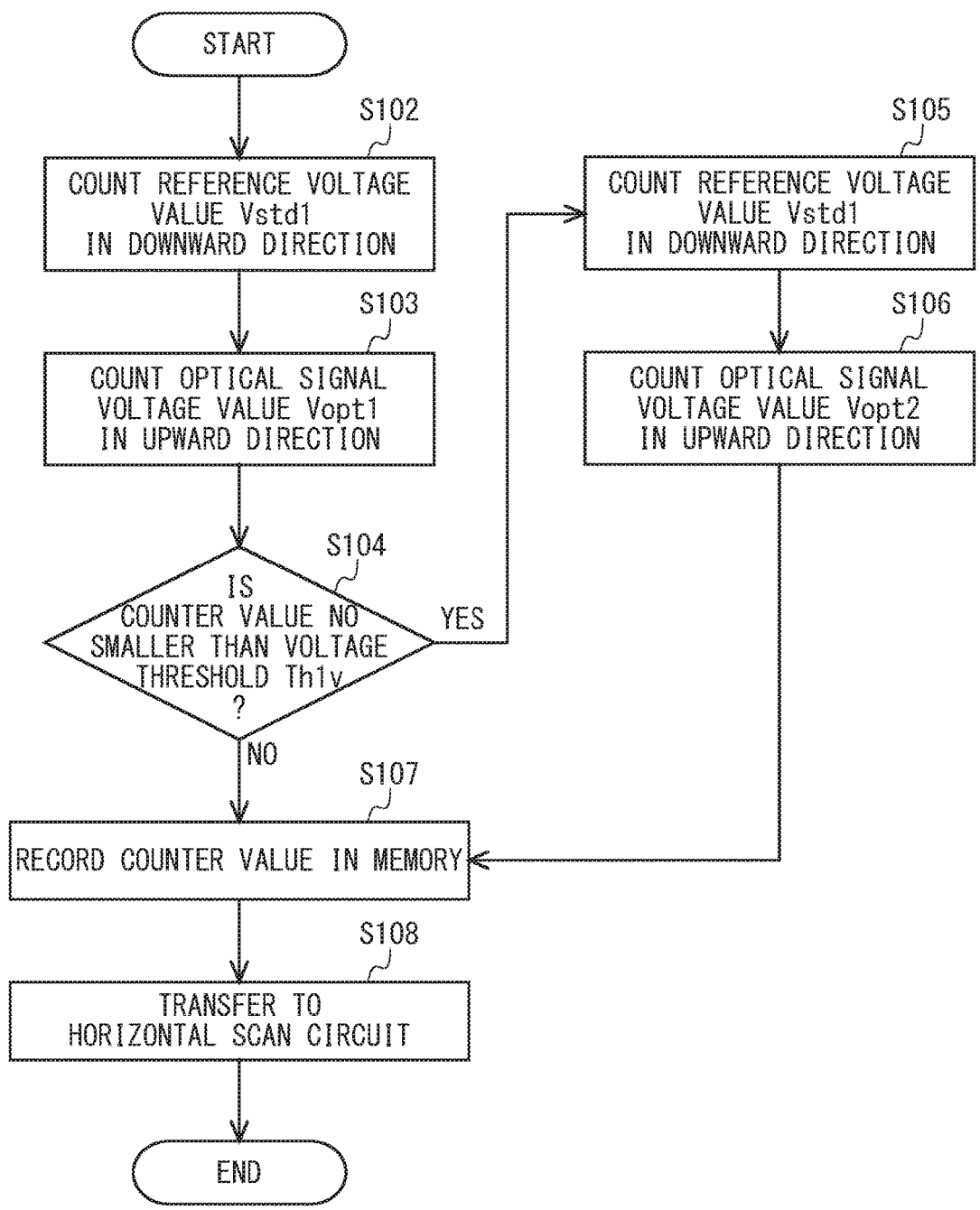
FIG. 9 shows a flowchart showing an operation in which a global shutter operation of the column processing circuit according to the first exemplary embodiment is performed.

FIG. 9 is a flowchart showing an operation in which a global shutter operation of the column processing circuit 60 according to the first exemplary embodiment is performed. Firstly, at a time t15, as the signal φsel1 becomes a high level, the selection transistor 147 is turned on and hence the pixel parts 50-1 is selected. At this point, as the signal φrst1a becomes a high level, the node 144 is reset. After that, at a time t16, as the signal φtx1b becomes a high level, the voltage level of the capacitor 139 is recorded in the node 144. Specifically, as the node 144 is reset at the time t15, the reference potential is recorded in the node 144. Note that the capacitance of the capacitor 139 is sufficiently larger than the stray capacitance of the node 144. Therefore, at the time t16, when the node 144, in which the reference potential has been recorded, is charged by the capacitor 139, the voltage level of the node 144 becomes roughly equal to the voltage level of the capacitor 139.

Further, at this point, the potential of the node 144 is transferred to the column signal line 170 through the amplifier 146. In other words, the voltage level of the capacitor 139 is transferred to the column signal line 170. The voltage generated in the load 171 is amplified by the programmable amplifier 172 and the amplified voltage is transferred to the comparator a 173. At this point, a ramp waveform is input to the comparator a 173. Further, the counter 174 has been reset in advance before the measurement.

When the ramp waveform is input to the comparator a 173, the counter 174 counts (i.e., measures) a reference voltage value Vstd1, which is obtained by amplifying the reference potential accumulated in the capacitor 139 by the programmable amplifier 172, in a downward direction. After that, when the value output from the programmable amplifier 172 matches the value of the ramp waveform, the comparator a 173 outputs a pulse to the counter 174. As a result, the counter 174 stops the counting operation (step S102). In this manner, a counter value corresponding to a value that is obtained by reversing the sign (i.e., the positive/negative) of the reference voltage value Vstd1 is obtained.

Next, at a time t17, as the signal φrst1a becomes a high level, the node 144 is reset again. Next, at a time t18, as the signal φtx1c becomes a high level, the voltage level of the capacitor 141 in which the first optical signal has been recorded is output to the column signal line 170 through the amplifier 146 in a manner similar to the process performed at the time t16.

Note that in the column processing circuit 60, when the ramp waveform is supplied to the comparator a 173, the counter 174 counts (i.e., measures) an optical signal voltage value Vopt1, which is obtained by amplifying the voltage level of the first optical signal accumulated in the capacitor 141 by the programmable amplifier 172, in an upward direction. After that, when the value output from the programmable amplifier 172 matches the value of the ramp waveform, the comparator a 173 outputs a pulse to the counter 174. As a result, the counter 174 stops the counting operation (step S103). In this manner, a counter value corresponding to the optical signal voltage value Vopt1 is obtained.

It should be noted that the counter 174 counts the reference voltage value Vstd1 in the downward direction in the time t16, i.e., in the step S102 and counts the optical signal voltage value Vopt1 in the upward direction in the time t17, i.e., in the step S103. Therefore, this means that the counter 174 counts (i.e., measures) a difference between the reference voltage value Vstd1 and the optical signal voltage value Vopt1. That is, it means that a CDS process has been performed for the first optical signal. In this manner, a counter value that correspond to a value that is obtained by subtracting the reference voltage from the voltage value of the first optical signal obtained by the optoelectronic conversion performed in the first period T1 is obtained in the counter 174.

When the reading of the first optical signal obtained in the first period T1 has been finished, the comparator b 176 compares the counter value obtained by the counter 174 with a predetermined voltage threshold Th1v. That is, the comparator b 176 determines whether or not the counter value obtained by the counter 174 is equal to or greater than the voltage threshold Th1v (step S104). When the first optical signal obtained in the first period T1 is equal to or greater than the voltage threshold Th1v (Yes at S104), the comparator b 176 instructs the counter 174 to perform an addition operation of the second optical signal obtained in the second period T2, i.e., a combining operation. On the other hand, when the first optical signal obtained in the first period T1 is smaller than the voltage threshold Th1v (No at S104), the comparator b 176 instructs the counter 174 not to perform the addition operation of the second optical signal obtained in the second period T2, i.e., the combining operation.

Note that the voltage threshold Th1v is defined so that when the first optical signal obtained in the first period T1 is equal to or greater than the voltage threshold Th1$v$, the noise in the first optical signal obtained in the first period T1 is equal to or larger than the noise in the second optical signal obtained in the second period T2. The voltage threshold Th1$v$ is explained hereinafter with reference to FIG. 10.

Figure 10:
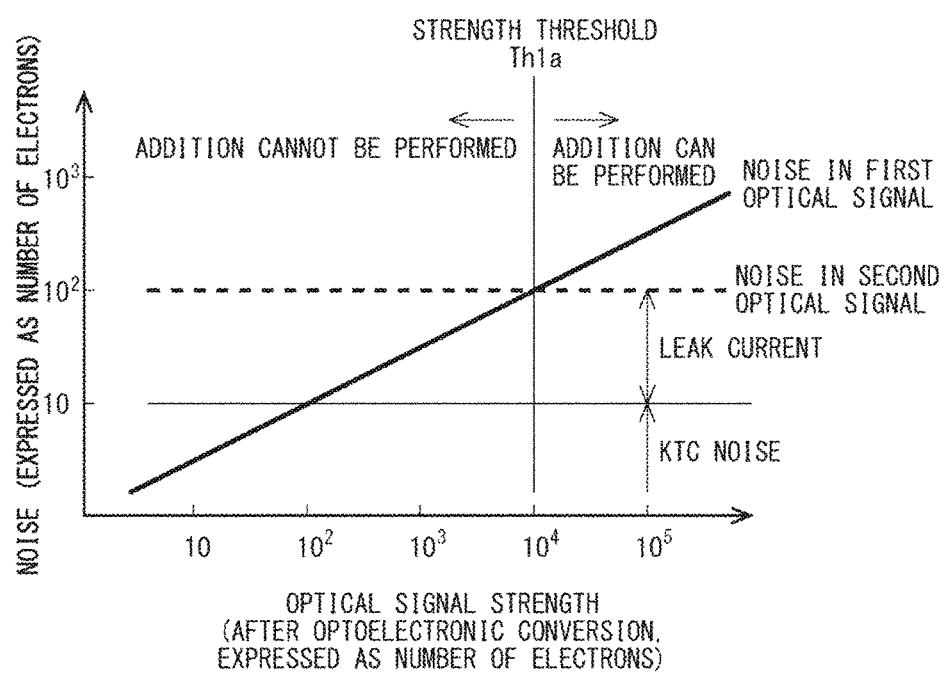
FIG. 10 shows a comparison between noises in a first optical signal and noises in a second optical signal.

FIG. 10 is a graph for comparing the noises of the first and second optical signals. In FIG. 10, the bold solid line indicates noises of the first optical signal and the bold broken line indicates noises of the second optical signal. In FIG. 10, the horizontal axis indicates the strength of the first optical signal, specifically, the number of electrons of the first optical signal after the optoelectronic conversion. Further, the vertical axis indicates the noise in each of the first and second optical signals, specifically, the number of electrons equivalent to the noise.

The second optical signal obtained in the second period T2 has been recorded in the capacitor 143. However, in order to prevent or reduce the increase in the number of capacitors, no capacitor for accumulating the reference potential corresponding to the second optical signal is provided in each of the pixel parts 50 of the solid-state image pickup device 100 according to this exemplary embodiment. In other words, the reference potential corresponding to the second optical signal is not stored. In this exemplary embodiment, when a global shutter operation is performed, the reference potential accumulated in the capacitor 139, i.e., the first reference potential is also used for the CDS process for the second optical signal. In other words, in this exemplary embodiment, the first reference potential is used for both the CDS process for the first optical signal and the CDS process for the second optical signal.

Further, there is no correlation between the first reference potential recorded in the capacitor 139 and the second optical signal recorded in the capacitor 143. Therefore, for the second optical signal, the effect of the KTC noise, which is the thermal noise occurring for the stray capacitance 133C of the floating diffusion 133, cannot be ignored. This is because the KTC noise and the reset potential by the KTC noise in the floating diffusion 133 differ from one another depending on the timing at which the floating diffusion 133 is cancelled.

Specifically, for the first optical signal, the floating diffusion 133 is reset at the time t1 and after that the first reference potential is recorded in the capacitor 139 at the time t2. Further, the first optical signal is recoded in the capacitor 141 at the time t4. In this case, the reset noise occurring in the reset at the time t1, i.e., the KTC noise is canceled by the CDS process performed in the steps S102 and S103. Meanwhile, for the second optical signal, the floating diffusion 133 is reset at the time w1, which is timing different from the timing of the reset at the time t1, and after that the second optical signal is recorded in the capacitor 143 at the time w3. In this case, the reset noise occurring in the reset at the time w1, i.e., the KTC noise could differ from the KTC noise at the time t1. Therefore, there is a possibility that the KTC noise in the second optical signal is not cancelled by the CDS process. Accordingly, unlike the first optical signal, the effect of the KTC noise needs to be taken into consideration in the second optical signal.

Note that if the potential in the floating diffusion 133 can be accumulated in a capacitor as a reference potential corresponding to the second optical signal after the reset performed at the time w1 in the second period T2, the KTC noise can be cancelled by the CDS process. By doing so, the need for taking the KTC noise into consideration is eliminated even in the second optical signal. However, as described above, since it is preferred to prevent or reduce the increase in the number of capacitors, no capacitor for accumulating the reference potential corresponding to the second optical signal is provided in this exemplary embodiment. To put it the other way around, there is no need to provide any capacitor for accumulating the reference potential corresponding to the second optical signal in this exemplary embodiment as described later.

It should be noted that since the stray capacitance 133C is very small, the KTC noise is large. Further, noises are also caused by the leak current of the capacitor 143. The total noise of the KTC noise and the noise caused by the leak current and the like amounts to, for example, 50 to 100 electrons as expressed as the number of electrons as indicated by the bold broken line in FIG. 10. Therefore, if the second optical signal containing such noises is combined with the first optical signal without performing any noise reduction process in order to expand the dynamic range, the pixel signal becomes an optical signal having large noises as a whole. Meanwhile, the first optical signal obtained in the first period T1 has been recorded in the capacitor 141. Noises also occur in this first optical signal. Examples of the noises that occur in the first optical signal include noises caused by the leak current of the capacitor and shot noises. In the first exemplary embodiment, the shot noise is examined as a noise that occurs in the first optical signal. The magnitude (or the amount) of the shot noise is equal to the square root of the optical signal. That is, as represented by the bold-type solid line in FIG. 10, the shot noise increases as the strength of the optical signal increases.

Further, as shown in FIG. 10, when the strength of the first optical signal is small, the noise in the first optical signal, i.e., the shot noise is smaller than the noise in the second optical signal. In this state, when the second optical signal is combined with the first optical signal, the effect of the noise in the second optical signal appears in the image quality (i.e., affects the image quality). On the other hand, when the strength of the first optical signal is large, the noise in the first optical signal, i.e., the shot noise is larger than the noise in the second optical signal. In this state, even if the second optical signal is combined with the first optical signal, the effect of the noise in the second optical signal that appears in the image quality is small. Therefore, in order to expand the dynamic range, the second optical signal may be combined with the first optical signal when the noise in the first optical signal is equal to or larger than the noise in the second optical signal.

Note that as shown in FIG. 10, when the strength of the first optical signal is equal to a strength threshold Th1$a$, the noise in the first optical signal is equal to the noise in the second optical signal. For example, when the noise in the second optical signal is 50 to 100 electrons as expressed as the number of electrons, the strength threshold Th1$a$ is 2,500 to 10,000 as expressed as the number of electrons. In FIG. 10, the strength threshold Th1$a$ is $10^4$, i.e., 10,000. Note that although the noise in the second optical signal includes the KTC noise and the noise caused by the leak current in FIG. 10, the noise in the second optical signal is not limited to such noises. Therefore, the strength threshold Th1$a$ is determined by actually measuring the light intensity and the noise by using the solid-state image pickup device 100.

Therefore, when the strength of the first optical signal is equal to or larger than the strength threshold Th1$a$, the noises in the first optical signal are equal to or larger than the noises in the second optical signal, and hence the column processing circuit 60 may combine the second optical signal with the first optical signal. On the other hand, when the strength of the first optical signal is smaller than the strength threshold Th1a, the noises in the first optical signal are smaller than the noises in the second optical signal, and hence the column processing circuit 60 does not combine the second optical signal with the first optical signal.

Note that the voltage threshold Th1v is determined so as to correspond to the strength threshold Th1a. That is, the voltage threshold Th1v is determined so that when the strength of the optical signal accumulated in the pixel unit 50 is equal to the strength threshold Th1a, the counter value of the counter 174 is equal to the voltage threshold Th1v. Further, the larger the strength of the optical signal accumulated in the pixel unit 50 is, the large the counter value of the counter 174 becomes. Therefore, when the counter value is equal to or greater than the voltage threshold Th1v, the strength of the first optical signal is equal to or higher than the strength threshold Th1a. Similarly, when the counter value is smaller than the voltage threshold Th1v, the strength of the first optical signal is smaller than the strength threshold Th1a.

When the counter value is equal to or greater than the voltage threshold Th1v (Yes at S104), the comparator b 176 outputs a signal indicating that addition is possible to the counter 174. As a result, the counter 174 performs an addition operation. This addition operation is performed by subsequently performing a counter operation in steps S105 and S106 by using the counter value obtained in the step S103 as explained below. Firstly, at a time w14, as the signal φrst1a becomes a high level, the node 144 is reset. After that, at a time w15, as the signal φtx1b becomes a high level, the first reference potential recoded in the capacitor 139 is transferred to the node 144. Since the selection transistor 147 is in an on-state at this point, the amplifier 146 outputs the second optical signal transferred to the node 144 to the column signal line 170. That is, similarly to the process at the time t16, the voltage level of the capacitor 139 in which the first reference potential for the first period T1 is recorded is transferred to the column signal line 170 through the amplifier 146.

Note that similarly to the process in the step S102, when a ramp waveform is supplied to the comparator a 173 in the column processing circuit 60, the counter 174 counts (i.e., measures) the reference voltage value Vstd1, which is obtained by amplifying the first reference potential accumulated in the capacitor 139 by the programmable amplifier 172, in a downward direction. Further, when the value output from the programmable amplifier 172 matches the value of the ramp waveform, the comparator a 173 outputs a pulse to the counter 174. As a result, the counter 174 stops the counting operation (step S105). In this manner, a counter value corresponding to a value that is obtained by reversing the sign (i.e., the positive/negative) of the reference voltage value Vstd1 is obtained. Note that, in practice, the counter value of the counter 174 at this point is in a state where the counter value corresponding to the first reference potential is further added to the counter value corresponding to the value obtained by subtracting the reference voltage from the voltage value of the first optical signal in the step S103.

Next, at a time w16, as the signal φrst1a becomes a high level, the node 144 is reset again. Next, at a time w17, as the signal φtx1d becomes a high level, the voltage level of the second optical signal recorded in the capacitor 143 is transferred to the node 144. Since the selection transistor 147 is in an on-state at this point, the voltage level of the capacitor 143 in which the second optical signal has been recorded is transferred to the column signal line 170 through the amplifier 146 as in the case of the process performed at the time t18.

In other words, the voltage level of the second optical signal accumulated in the capacitor 143 is transferred to the column signal line 170. As described above, the voltage generated in the load 171 is amplified by the programmable amplifier 172 and the amplified voltage is transferred to the comparator a 173. At this point, a ramp waveform is input to the comparator a 173. When the ramp waveform is input to the comparator a 173, the counter 174 counts (i.e., measures) an optical signal voltage value Vopt2, which is obtained by amplifying the voltage level of the second optical signal accumulated in the capacitor 143 by the programmable amplifier 172, in an upward direction. Then, when the value output from the programmable amplifier 172 matches the value of the ramp waveform, the comparator a 173 outputs a pulse to the counter 174. As a result, the counter 174 stops the counting operation (step S106). In this way, the CDS processing for the second optical signal obtained in the second period T2 has been finished. Further, the counter value of the counter 174 at this point corresponds to a value that is obtained by adding the second optical signal obtained in the second period T2 for which the CDS processing has been finished to the first optical signal obtained in the first period T1 for which the CDS processing has been finished.

On the other hand, when the counter value of the counter 174 at the end of the step S103 is smaller than the voltage threshold Th1v (No at S104), the addition operation is not performed. That is, the comparator b 176 outputs a signal indicating that addition cannot be performed to the counter 174. As a result, the counter 174 suspends its operation while the second optical signal is being output to the column signal line 170, i.e., during the time w14 to w17. Therefore, only the processing result of the first optical signal obtained in the first period T1 remains in the counter 174.

Next, the counter 174 transfers the counter value to the memory 175. The memory 175 accumulates the counter value in which the second optical signal is combined with the first optical signal (when the steps S105 and S106 have been performed) or the counter value of the first optical signal alone (when the steps S105 and S106 have not been performed) (step S107). Finally, the horizontal scan circuit 177 reads the counter value accumulated in the memory 175 (step S108). The horizontal scan circuit 177 transmits the counter value corresponding to the digital value of the pixel signals to the subsequent circuit on a column-by-column basis. In this way, the processing for one row of pixels is finished.

Next, in a time t25 to w27, processes similar to those in the above-described time t15 to w17, respectively, are performed for the next pixel unit 50-2. That is, a counter value, i.e., a digital value, corresponding to a pixel signal for the pixel unit 50-2 is read. When pixel signals for all the pixel units 50 connected to the column signal lines 170 are read in this way, the signal reading for one entire image has been finished.

Figure 11:
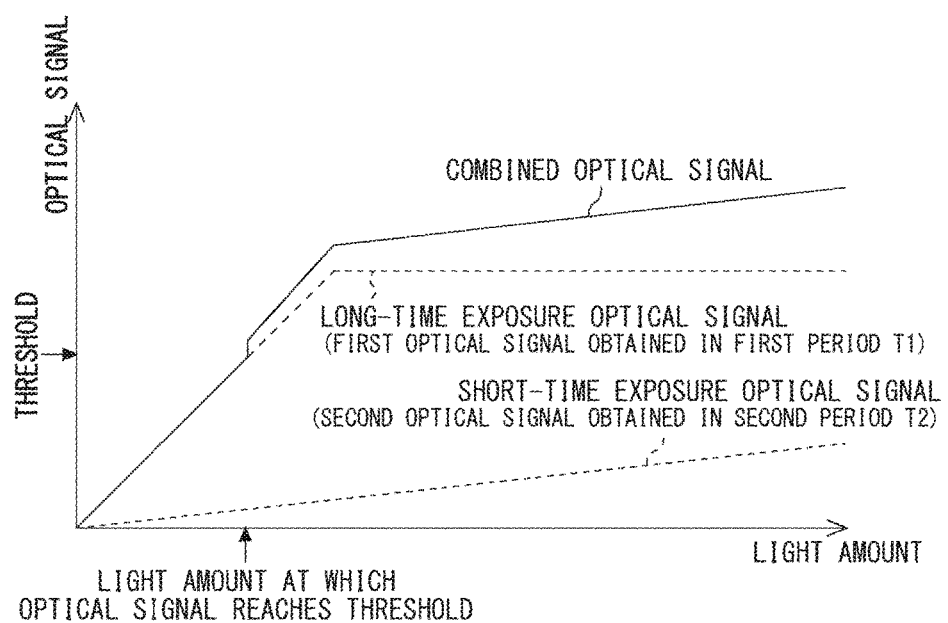
FIG. 11 is a graph showing a relation between amounts of light and optical signals in the first exemplary embodiment.

FIG. 11 is a graph showing a relation between amounts of light and optical signals in the first exemplary embodiment. In FIG. 11, the horizontal axis indicates the amount of light accumulated in the photo-diode 130 and the vertical axis indicates the voltage level of an optical signal read from the pixel unit 50. Further, the solid line represents an optical signal read from the pixel unit 50. Further, the broken line represents an optical signal obtained by a long-time (first period T1) exposure or an optical signal obtained by a short-time (second period T2) exposure. As shown in FIG. 11, the optical signal increases in proportion to the light amount. However, when the optical signal reaches the upper limit of the dynamic range, it saturates at the certain optical signal voltage level.

Meanwhile, in the first exemplary embodiment, as represented by the solid line in FIG. 11, the read optical signal contains only the first optical signal obtained in the first period T1 until the voltage level of the first optical signal obtained in the first period T1 reaches a predetermined threshold. Note that the "predetermined threshold" is a voltage level corresponding to the voltage threshold Th1$v$. Then, when the voltage level of the first optical signal obtained in the first period T1 reaches the predetermined threshold, an optical signal that is obtained by combing the second optical signal obtained in the second period T2 with the first optical signal is read. Therefore, even after the voltage level of the first optical signal obtained in the first period T1 saturates, the optical signal, which is obtained by combining the second optical signal with the first optical signal, continues to increase as the light amount increases. As a result, the dynamic range can be increased.

As described above, in the first exemplary embodiment, in the case of a global shutter operation, the second optical signal obtained in the second period T2, i.e., obtained by the short-time exposure is accumulated in the capacitors 143 and 163. However, since the first reference potential is used for the CDS process for the second optical signal, there is no need to provide any capacitor for accumulating the reference potential corresponding to the second optical signal. Therefore, the solid-state image pickup device 100 according to the first exemplary embodiment can expand the dynamic range while preventing or reducing the increase in the number of capacitors.

Further, as described above, since the combination of optical signals is performed only when the first optical signal is equal to or larger than the predefined threshold, it is possible to prevent the increase in the effect of noises which would otherwise be caused when the second optical signal is combined with the first optical signal. That is, if the first reference potential is simply used for the CDS process for the second optical signal obtained by the short-time exposure, there is a possibility that the image quality could deteriorate as the second optical signal is combined with the first optical signal because of the variations of the KTC noise occurring in the floating diffusion. For this reason, the first reference potential cannot be simply used for the CDS process for the second optical signal. In contrast to this, in the first exemplary embodiment, the second optical signal is combined with the first optical signal only when the effect of the noise in the optical signal accumulated in the floating diffusion does not appear in the image quality (i.e., does not affect the image quality). Therefore, in the first exemplary embodiment, it is possible to prevent the increase in the effect of the noise even though the first reference potential is used for the CDS process for the second optical signal. That is, in the first exemplary embodiment, it is possible to expand the dynamic range while preventing the increase in the number of capacitors and preventing the increase in the effect of the noise.

Here, the capacitors 141 and 161 that record the first optical signal in the first period T1 are compared with the capacitors 143 and 163 that record the second optical signal in the second period T2. The first optical signal having a long exposure time is used to make a dark scene clearer. In this case, optical signals whose amount of light is small could be accumulated in the capacitors 141 and 161. When the amount of light is small, the optical signal is susceptible to the effect of noises. Therefore, it is desirable to reduce the noises in the capacitors 141 and 161 as much as possible. In contrast to this, the capacitors 143 and 163 are used for photographing for expanding the optical signal when the amount of the optical signal is large. Therefore, the noises in the capacitors 143 and 163 are tolerant to noises to some extent.

Note that the larger the capacitance of a capacitor is, the smaller the noise in that capacitor becomes. Therefore, the capacitances of the capacitors 141 and 161 may be increased and the capacitances of the capacitors 143 and 163 may be reduced. That is, the capacitances of the capacitors 141 and 161 do not necessarily have to be equal to those of the capacitors 143 and 163. Note that the capacitors 139 and 159 are also used to accumulate the reference potential corresponding to the first optical signal. That is, they accumulate signals related to the first optical signal. Therefore, it is desirable to increase the capacitances of the capacitors 139 and 159 to lower their noises. That is, the capacitance of the capacitors 139 and 141 may be larger than the capacitance of the capacitor 143 ((Capacitance of capacitors 139 and 141)>(Capacitance of capacitor 143)).

Note that when the capacitances of the capacitors 143 and 163 are relatively reduced, the noises of the capacitances 143 and 163 could be increased. Therefore, the noise in the second optical signal in FIG. 10 could be increased. Accordingly, it is necessary to increase the strength threshold Th1$a$, i.e., the voltage threshold Th1$v$. This strength threshold Th1$a$, i.e., the voltage threshold Th1$v$ may be set by using various methods. For example, it may be easily set by determining it by experiment.

The reason why the noise of a capacitor is lowered as its capacitance is increased is described hereinafter. The capacitors 139, 141 and 143 accumulate electric charges and thereby store signals as voltage. Further, the capacitors 139, 141 and 143 drive the node 144 through the switch transistors 138, 140 and 142. Note that the stray capacitance of the node 144 includes the wiring capacitance, the gate capacitance of the selection transistor 147, and so on, and the voltage of the signals varies by an amount corresponding to the ratio of the stray capacitance to the capacitance of the capacitor. Therefore, the larger the capacitance of the capacitor is, the smaller the variations of the voltage signal becomes. As a result, correct signals can be transferred. In other words, the larger the capacitance of the capacitor is, the smaller the noise becomes.

(Rolling Shutter Operation)

Next, a rolling shutter operation is explained. Unlike the global shutter operation, all the pixels are not simultaneously processed in the rolling shutter operation. That is, pixels are processed on a row-by-row basis in the rolling shutter operation. In the global shutter operation, since all the pixels are simultaneously exposed, the time information is the same as each other for all the pixels. Therefore, an image having no distortion can be obtained in the global shutter operation.

Meanwhile, in general, the rolling shutter operation contains fewer noises than the global shutter operation does. In the global shutter operation, exposures are simultaneously performed for all the pixels and pixel signals of all the pixels are simultaneously accumulated. Then, the accumulated pixel signals are successively read on a row-by-row basis. Therefore, the lower the row of pixels is located, the longer time the pixel signals of that row are held for. The longer this holding time is, the more noises are superposed on the held signal electric charges and the more the image quality deteriorates. In contrast to this, in the case of the rolling shutter operation, exposures are successively performed and pixel signals are successively accumulated on a row-by-row basis. Then, the accumulated pixel signals are successively read on a row-by-row basis. Therefore, it is unnecessary to hold the pixel signals in the accumulation parts, or the holding time may be short. Consequently, noises can be reduced.

In the first exemplary embodiment, by using the rolling shutter operation, the time during which pixel signals need to be held can be reduced compared to the time in the global shutter operation. As a result, noises that are superposed (i.e., accumulated) on the held pixel signals can be lowered. Therefore, the rolling shutter operation or the global shutter operation can be used depending on the situation. For example, when an image of a subject for which the image distortion does not cause a problem, such as a substantially standstill subject, is taken, the rolling shutter operation may be used. On the other hand, when an image of a subject for which the image distortion needs to be avoided, such as a moving subject, is taken, the global shutter operation may be used.

A method for increasing the dynamic range that is used when the rolling shutter operation is performed in the first exemplary embodiment is explained hereinafter. Note that even when the rolling shutter operation is performed, the same circuit configuration as that of the solid-state image pickup device 100 shown in FIGS. 5 to 7 can be used. That is, both the global shutter operation and the rolling shutter operation can be performed by using the same circuit configuration.

Figure 12:
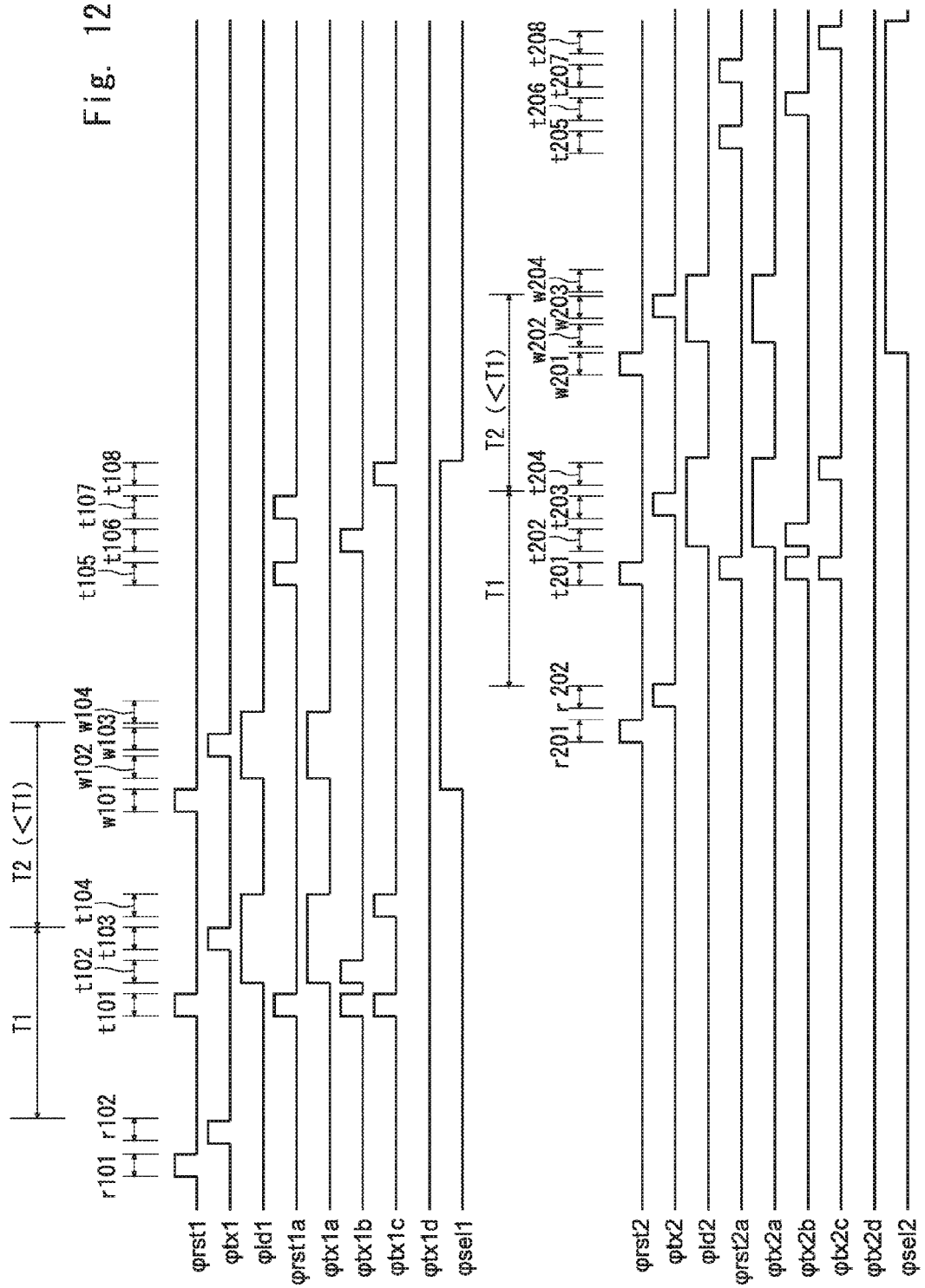
FIG. 12 shows a timing chart for a rolling shutter operation according to the first exemplary embodiment.
Figure 13:
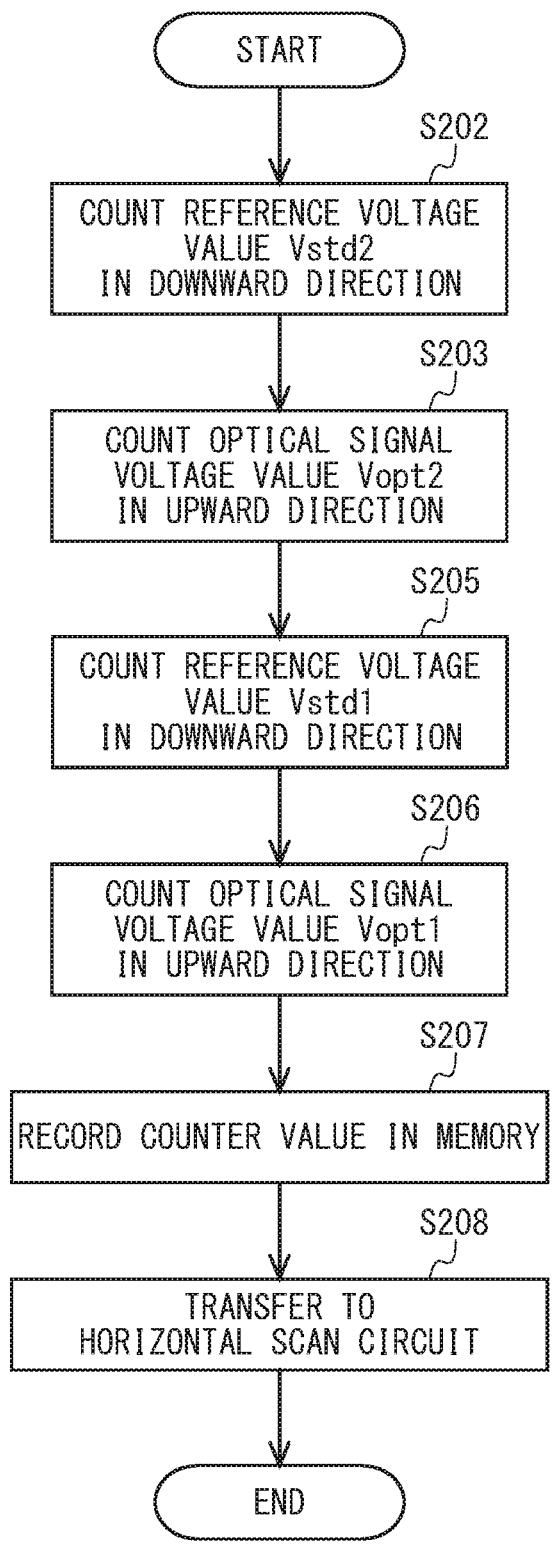
FIG. 13 shows a flowchart showing an operation in which a rolling shutter operation of the column processing circuit according to the first exemplary embodiment is performed.

FIG. 12 shows a timing chart for a rolling shutter operation according to the first exemplary embodiment. Further, FIG. 13 shows a flowchart showing an operation in which the rolling shutter operation of the column processing circuit 60 according to the first exemplary embodiment is performed. In the below-explained rolling shutter operation, processing for the pixel unit 50-1 is first performed and then processing for the pixel unit 50-2 is performed.

At a time r102 to t108, the process for the pixel parts 50-1 is performed. Specifically, firstly, at a time r101, as the signal φrst1 becomes a high level, the floating diffusion 133 is reset. Next, at a time r102, as the signal φtx1 becomes a high level, electrons accumulated in the photodiode 130 are transferred to the floating diffusion 133. As a result, the photodiode 130 becomes empty of electrons. After that, an exposure, i.e., an optoelectronic conversion is performed so that light is incident on the photodiode 130 in this state. This optoelectronic conversion is performed (i.e., continued) from the end of the time r102 to the moment when the next transfer of electrons from the photodiode 130 to the floating diffusion 133 has been finished, i.e., to the end of a time t103. This period from the end of the time r102 to the end of the time t103 is the first period T1. Note that in the case of the rolling shutter operation, the operations at the time r101 and r102 are performed at timings that are different from one another for each pixel. Note that in the case of the global shutter operation, these operations are simultaneously performed for all the pixels as shown in FIG. 8.

Next, at a time t101, as the signal φrst1 becomes a high level, the floating diffusion 133 is reset. Further, at this point, as the signals φrst1a, φtx1b and φtx1c become a high level, the capacitors 139 and 141 are reset. It should be note that in the global shutter operation, the signal φtx1c also becomes a high level and hence the capacitor 143 is reset. However, in the rolling shutter operation, the capacitor 143 is not used as described later. Therefore, in the case of the rolling shutter operation, the reset operation for the capacitor 143 is not performed. Since the reset operation for the capacitor 143 is not performed, the power consumption is reduced. Further, as described previously, the reset operation for the capacitors 139 and 141 is performed to set the voltage directions of the capacitors in the writing of signals to the same direction. Therefore, this reset operation is not indispensable.

Next, at a time t102 to t104, the signals φld1 and φtx1a become a high level. Further, at a time t102, as the signal φtx1b becomes a high level, the reset potential of the floating diffusion 133, i.e., the reference potential is amplified by the amplification transistor 134 and recorded in the capacitor 139. At this point, as described above, the electric charges generated by the optoelectronic conversion performed during the first period T1 have been accumulated in the photodiode 130. At a time t103, as the signal φtx1b becomes a low level and the signal φtx1 becomes a high level, the electric charge (electrons in this example) of the photodiode 130 is transferred to the floating diffusion 133 and hence the potential of the floating diffusion 133 changes. Next, at a time t104, as the signal φtx1 becomes a low level and the signal φtx1c becomes a high level, the potential of the floating diffusion 133 after the electric charge transfer is amplified by the amplification transistor 134 and recorded in the capacitor 141. In this way, the first optical signal obtained in the first period T1 is recorded in the capacitor 141, i.e., in the first optical signal accumulation unit. Further, the first reference potential corresponding to the first optical signal is recorded in the capacitor 139, i.e., the first reference potential accumulation unit.

Further, in the photodiode 130, at and after the time t104 after the electric charge transfer performed at the time t103, the accumulation of the second optical signal in the second period T2 is being performed. The second period T2 is a period from the end of the time t103 to the moment when the next transfer of electrons from the photodiode 130 to the floating diffusion 133 has been finished, i.e., to the end of a time w103. It should be noted that, similarly to the above-described global shutter operation, the first period T1 is also longer than the second period T2 even in the rolling shutter operation.

When the second period T2 starts, the second optical signal is accumulated in the photodiode 130. After that, at a time w101, as the signal φrst1 becomes a high level, the floating diffusion 133 is reset. That is, at the time w101, the second reference potential of the second optical signal is accumulated in the floating diffusion 133. Therefore, the floating diffusion 133 has a function as a second reference potential accumulation unit. Next, at a time w102, the signals φld1, φtx1a and φsel1 become a high level.

It should be noted that in this exemplary embodiment, the rolling shutter operation differs from the global shutter operation in the following point. In the case of the global shutter operation, the second optical signal as well as the first optical signal is accumulated in the capacitors. In contrast to this, in the case of the rolling shutter operation, the second optical signal is transferred to the column processing circuit 60 through the column signal line 170 without being accumulated in a capacitor.

Further, in the case of the global shutter operation, in the CDS process for the second optical signal, the reference potential corresponding to the second optical signal, i.e., the second reference potential is not read out and the reference potential corresponding to the first optical signal, i.e., the first reference potential is used on behalf of the second reference potential. In contrast to this, in the case of the rolling shutter operation, at the time w102, the second reference potential accumulated in the floating diffusion 133 is transferred to the column processing circuit 60 through the column signal line 170. Therefore, in the case of the rolling shutter operation, since the second reference potential is used for the CDS process for the second optical signal, the KTC noise is also cancelled in the second optical signal and hence the occurrence of the KTC noise in the second optical signal is also prevented or reduced. Therefore, the noise in the second optical signal in the rolling shutter operation is smaller than that in the global shutter operation. Accordingly, the first and second optical signals can be combined with each other for all the pixels irrespective of the magnitude (i.e., the strength) of the first optical signal. Consequently, the accuracy in the rolling shutter operation is higher than the accuracy in the global shutter operation.

At the time w102, the second reference potential corresponding to the second optical signal is transferred to the column signal line 170 through the amplifier 146. In other words, the voltage level of the floating diffusion 133 is transferred to the column signal line 170. The voltage generated in the load 171 is amplified by the programmable amplifier 172 and the amplified voltage is transferred to the comparator a 173. At this point, a ramp waveform is input to the comparator a 173. Further, the counter 174 has been reset in advance before the measurement.

When the ramp waveform is input to the comparator a 173, the counter 174 counts (i.e., measures) a reference voltage value Vstd2, which is obtained by amplifying the second reference potential accumulated in the floating diffusion 133 by the programmable amplifier 172, in a downward direction. After that, when the value output from the programmable amplifier 172 matches the value of the ramp waveform, the comparator a 173 outputs a pulse to the counter 174. As a result, the counter 174 stops the counting operation (step S202). In this manner, a counter value corresponding to a value that is obtained by reversing the sign (i.e., the positive/negative) of the reference voltage value Vstd2 is obtained.

Next, at a time w103, as the signal φtx1 becomes a high level, the electric charge accumulated in the photodiode 130 in the second period T2 is transferred to the floating diffusion 133. Then, at a time w104, the signal φtx1 becomes a low level. At this point, since the signals φld1, φtx1a and φsel1 are in a high state, the second optical signal is transferred to the column signal line 170 through the amplifier 146. In other words, the voltage level of the floating diffusion 133 is transferred to the column signal line 170. The voltage generated in the load 171 is amplified by the programmable amplifier 172 and the amplified voltage is transferred to the comparator a 173. At this point, a ramp waveform is input to the comparator a 173.

When the ramp waveform is input to the comparator a 173, the counter 174 counts (i.e., measures) an optical signal voltage value Vopt2, which is obtained by amplifying the second optical signal accumulated in the floating diffusion 133 by the programmable amplifier 172, in an upward direction. After that, when the value output from the programmable amplifier 172 matches the value of the ramp waveform, the comparator a 173 outputs a pulse to the counter 174. As a result, the counter 174 stops the counting operation (step S203).

In this manner, the CDS process for the second optical signal obtained in the second period T2 has been finished. Further, the counter value of the counter 174 at this point is a value corresponding to the second optical signal obtained in the second period T2, for which the CDS process has been performed for a difference between the reference voltage value Vstd2 and the optical signal voltage value Vopt2. Further, the signals φld1 and φtx1a become a low level at the end of a time w104.

Next, a reading process for the first optical signal is performed. It should be noted that in the case of the global shutter operation, it is determined whether or not the second optical signal should be combined with the first optical signal depending on the magnitude (i.e., the strength) of the first optical signal. Therefore, the first optical signal is first read out and then the second optical signal is combined with the first optical signal depending on the magnitude of the first optical signal. In contrast to this, in the case of the rolling shutter operation, since the second optical signal is not accumulated in a capacitor, the second optical signal is read out before the first optical signal. Note that as described above, since the noise in the second optical signal is small, the first and second optical signals can be combined with each other at all times. Therefore, the second optical signal is first read out, and after that the first optical signal is combined with the second optical signal.

Next, at a time t105, as the signal φrst1a becomes a high level, the node 144 is reset. After that, at a time t106, as the signal φtx1b becomes a high level, the voltage level of the capacitor 139 is recorded in the node 144. As a result, the voltage level of the node 144 becomes equal to the first reference voltage, which has been recorded in the capacitor 139. Further, the potential of the node 144 is transferred to the column signal line 170 through the amplifier 146. Note that similarly to the process in the step S102, in a step S205 in FIG. 13, the counter 174 counts (i.e., measures) the reference voltage value Vstd1, which is obtained by amplifying the reference potential accumulated in the capacitor 139 by the programmable amplifier 172, in a downward direction in the column processing circuit 60 connected to the column signal line 170. After that, when the value output from the programmable amplifier 172 matches the value of the ramp waveform, the comparator a 173 outputs a pulse to the counter 174. As a result, the counter 174 stops the counting operation (step S205).

Next, at a time t107, as the signal φrst1a becomes a high level, the node 144 is reset again. Next, at a time t108, as the signal φtx1c becomes a high level, the voltage level of the capacitor 141, in which the first optical signal has been recorded, is output to the column signal line 170 through the amplifier 146 as in the case of the process performed at the time t18. Note that in the column processing circuit 60, when the ramp waveform is supplied to the comparator a 173, the counter 174 counts (i.e., measures) an optical signal voltage value Vopt1, which is obtained by amplifying the voltage level of the first optical signal accumulated in the capacitor 141 by the programmable amplifier 172, in an upward direction. After that, when the value output from the programmable amplifier 172 matches the value of the ramp waveform, the comparator a 173 outputs a pulse to the counter 174. As a result, the counter 174 stops the counting operation (step S206).

In this manner, the CDS process for the first optical signal obtained in the first period T1 has been finished. Further, the counter value of the counter 174 at this point is a value that is obtained by adding the first optical signal obtained in the first period T1 and the second optical signal obtained in the second period T2 in a state where the CDS process has been already finished for both of them. Note that in the case of the rolling shutter operation, the comparator b 176 is not used.

After that, the counter 174 moves (i.e., transfers) the counter value to the memory 175. The memory 175 accumulates the counter value in a state where the first optical signal is combined with the second optical signal (step S207). Finally, the counter value accumulated in the memory 175 is read by the horizontal scan circuit 177 (step S208). The horizontal scan circuit 177 transmits the counter value corresponding to the digital value of the pixel signal to the subsequent circuit on a column-by-column basis. In this way, the process for one row of pixels has been finished.

Next, in times r201-r202, t201-t204, w201-w204, and t205-t208, processes similar to the above-described processes at the times r101-r102, t101-t104, w101-w104, and t105-t108, respectively, are performed for the next pixel parts 50-2. That is, counter values corresponding to pixel signals for the pixel parts 50-2, i.e., digital values are read out. When the pixel signals for all of the pixel parts 50 connected to the column signal line 170 are read out in this way, signal reading for all of the pixels of one image has been finished. It should be noted that the reading process for the pixel parts 50-2, i.e., the time W202 starts after the reading process for the pixel parts 50-1 has been finished, i.e., after the end of the time t108.

As described above, similarly to the global shutter operation, it is possible to expand the dynamic range while preventing the increase in the noise even in the global shutter operation. That is, in the first exemplary embodiment, in the case of the rolling shutter operation, optical signals obtained in the short-time exposures are accumulated in the photodiodes 130 and 150. Therefore, the solid-state image pickup device 100 according to the first exemplary embodiment can expand the dynamic range while preventing the increase in the number of capacitors. Further, by performing the CDS process on the reference potential corresponding to the optical signal obtained in the short-time exposure, the noise in the optical signal obtained in the short-time exposure can be reduced. Therefore, in the case of the rolling shutter operation, it is possible to combine the optical signal obtained in the short-time exposure with the optical signal obtained in the long-time exposure even when the optical signal obtained in the long-time exposure is small (i.e., weak). Accordingly, in the case of the rolling shutter operation, the accuracy of the photographing can be improved.

Modified Example

Note that the present invention is not limited to the above-described exemplary embodiments, and various modifications can be made without departing from the spirit of the present invention. For example, in each of the above-described flowcharts, at least one step can be omitted as appropriate. For example, the step S107 in FIG. 9 can be omitted. Further, the order of the steps in each of the above-described flowcharts can be changed as appropriate. For example, the order of the steps S102 and S103 in FIG. 9 can be reversed. These changes can be also made in FIG. 13. Further, the order of the steps S105 and S106 in FIG. 9 can be reversed.

Further, in the above-described exemplary embodiments, it is assumed that when the first optical signal obtained in the first period T1 is equal to or greater than the predetermined threshold, the noises in the first optical signal obtained in the first period T1 are equal to or larger than the noises in the second optical signal obtained in the second period T2. Further, the first exemplary embodiment is configured so that when the first optical signal is equal to or larger than the predetermined threshold, the second optical signal is combined with the first optical signal. However, the exemplary embodiments according to the present invention are not limited to such configurations. In the exemplary embodiment, the noises in the first optical signal may be compared with the noises in the second optical signal by actually measuring the noises in each of the first and second optical signals. However, actually measuring noises in optical signals is much more difficult than simply comparing optical signals with a threshold. Therefore, by configuring the device so that when the first optical signal is equal to or larger than the predetermined threshold, the second optical signal is combined with the first optical signal, the dynamic range can be increased more easily.

Further, although the CDS processing is performed by using a comparator and a counter in the first exemplary embodiment, the present invention is not limited to such configurations. The CDS processing may be performed by using a clamping circuit using a capacitor or may be performed by using a differential amplifier. Further, the AD conversion is also not limited to the method according to the above-described first exemplary embodiment. A pipeline-type AD converter may be used for the AD conversion.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A solid-state image pickup device comprising:
an optoelectronic conversion unit;
a first optical signal accumulation unit configured to accumulate a first optical signal obtained by performing an optoelectronic conversion in a first period by the optoelectronic conversion unit;
a first reference potential accumulation unit configured to accumulate a first reference potential corresponding to the first optical signal;
a second optical signal accumulation unit configured to accumulate a second optical signal obtained by performing an optoelectronic conversion in a second period by the optoelectronic conversion unit, the second period being shorter than the first period; and
a combining unit configured to perform a CDS process by using at least the first reference potential accumulated in the first reference potential accumulation unit and combine the first optical signal accumulated in the first optical signal accumulation unit and the second optical signal accumulated in the second optical signal accumulation unit.

2. The solid-state image pickup device according to claim 1, wherein in a case where a global shutter operation is performed, the combining unit performs a CDS process by counting a value corresponding to the first reference potential in a downward direction and counting a value corresponding to the second optical signal in an upward direction when the combining unit combines the second optical signal with the first optical signal.

3. The solid-state image pickup device according to claim 1, wherein a capacitance of the second optical signal accumulation unit is smaller than that of the first optical signal accumulation unit.

4. The solid-state image pickup device according to claim 1, wherein in a case where a global shutter operation is performed, the combining unit combines the second optical signal with the first optical signal when a noise in the first optical signal is equal to or larger than a noise in the second optical signal.

5. The solid-state image pickup device according to claim 4, wherein the combining unit determines that the noise in the first optical signal is equal to or larger than the noise in the second optical signal when a value of the first optical signal is equal to or greater than a predetermined threshold, and hence combines the second optical signal with the first optical signal.

6. The solid-state image pickup device according to claim 1, wherein
a capacitor is used as the second optical signal accumulation unit when a global shutter operation is performed, and
the optoelectronic conversion unit is used as the second optical signal accumulation unit when a rolling shutter operation is performed.

7. The solid-state image pickup device according to claim 6, wherein when the rolling shutter operation is performed, a second reference potential corresponding to the second optical signal is accumulated in a second reference potential accumulation unit.

8. The solid-state image pickup device according to claim 7, wherein when the rolling shutter operation is performed, the combining unit performs a CDS process by counting a value corresponding to the second reference potential in a downward direction and then counting a value corresponding to the second optical signal in an upward direction, and after that performs a CDS process by counting a value corresponding to the first reference potential in the downward direction and then counting a value corresponding to the first optical signal in the upward direction.

* * * * *